United States Patent [19]
Loen et al.

[11] Patent Number: 5,968,164
[45] Date of Patent: Oct. 19, 1999

[54] MIXED-ENDIAN COMPUTING ENVIRONMENT FOR A CONVENTIONAL BI-ENDIAN COMPUTER SYSTEM

[75] Inventors: Larry Wayne Loen, Rochester, Minn.; Edward John Silha, Austin, Tex.

[73] Assignee: International Business Machines Corporation, Armonk, N.Y.

[21] Appl. No.: 09/116,050

[22] Filed: Jul. 15, 1998

Related U.S. Application Data

[62] Division of application No. 08/393,968, Feb. 24, 1995.

[51] Int. Cl.[6] .............................. G06F 9/308; G06F 9/34; G06F 12/02

[52] U.S. Cl. ................................ 712/204; 710/4; 710/65; 710/127; 712/223

[58] Field of Search ...................................... 395/500, 842, 395/380, 350, 301, 280, 885; 364/DIG. 1, DIG. 2; 711/202, 147, 153, 201; 712/204; 710/4, 65, 127, 129; 709/9

[56] References Cited

U.S. PATENT DOCUMENTS

| | | | |
|---|---|---|---|
| 5,107,415 | 4/1992 | Sato et al. | 395/800 |
| 5,132,898 | 7/1992 | Sakamura et al. | 395/425 |
| 5,191,581 | 3/1993 | Woodbury et al. | 370/85.9 |
| 5,237,672 | 8/1993 | Ing-Simmons et al. | 395/425 |
| 5,251,312 | 10/1993 | Sodos | 395/425 |
| 5,261,077 | 11/1993 | Duval et al. | 395/500 |
| 5,287,470 | 2/1994 | Simpson | 395/425 |
| 5,313,231 | 5/1994 | Yin et al. | 345/199 |
| 5,398,328 | 3/1995 | Weber et al. | 395/500 |
| 5,408,664 | 4/1995 | Zarrin et al. | 364/DIG. 1 |
| 5,446,482 | 8/1995 | Van Aken et al. | 345/199 |
| 5,519,842 | 5/1996 | Atallah et al. | 711/202 |
| 5,574,923 | 11/1996 | Heeb et al. | 395/800 |
| 5,574,927 | 11/1996 | Scantlin | 395/800 |
| 5,630,084 | 5/1997 | Ikumi | 395/376 |
| 5,640,545 | 6/1997 | Baden et al. | 395/515 |
| 5,655,065 | 8/1997 | Robertson et al. | 395/133 |
| 5,687,337 | 11/1997 | Carnevale et al. | 395/380 |

FOREIGN PATENT DOCUMENTS

| | | |
|---|---|---|
| 0470570 | 2/1992 | European Pat. Off. . |
| 2229832 | 10/1990 | United Kingdom . |
| WO9415269 | 7/1994 | WIPO . |

OTHER PUBLICATIONS

Journal of Controlled Release, vol. 28, No. 1/03, Jan. 1, 1994, pp. 37–44, XP000435238, C.D. Ebert et al., Mucosal Delivery of Macromolecules.

IEEE Micro, vol. 14, No. 2, pp. 10–22, Steve Undy et al., "A Low–Cost Graphics and Multimedia Workstation Chip Set."

IEEE Micro, vol. 10, No. 3, pp. 9–21, David V. James, "Multiplexed Buses: The Endian Wars Continue."

COMPCON Spring '93 IEEE Computer Society Int'l. Conference, IEEE/EE Publications Ondisc., Patrick Knebel et al., "HP's PA7100LC: A Low–Cost Superscalar PA–RISC Processor."

*Primary Examiner*—Daniel H. Pan
*Attorney, Agent, or Firm*—Steven W. Roth

[57] ABSTRACT

A conventional bi-endian computer system is enhanced to include mixed-endian mechanisms that allows the computer system to dynamically change its endian mode. The mixed-endian computer system can change endian mode on a task by task basis if necessary. The mixed-endian mechanisms automatically format the data in the form expected by the running task, regardless of whether the task expects the data to be in big endian format or in little endian format. The mixed-endian mechanisms also format big and little endian instructions such that they can execute on the same computer system.

4 Claims, 19 Drawing Sheets

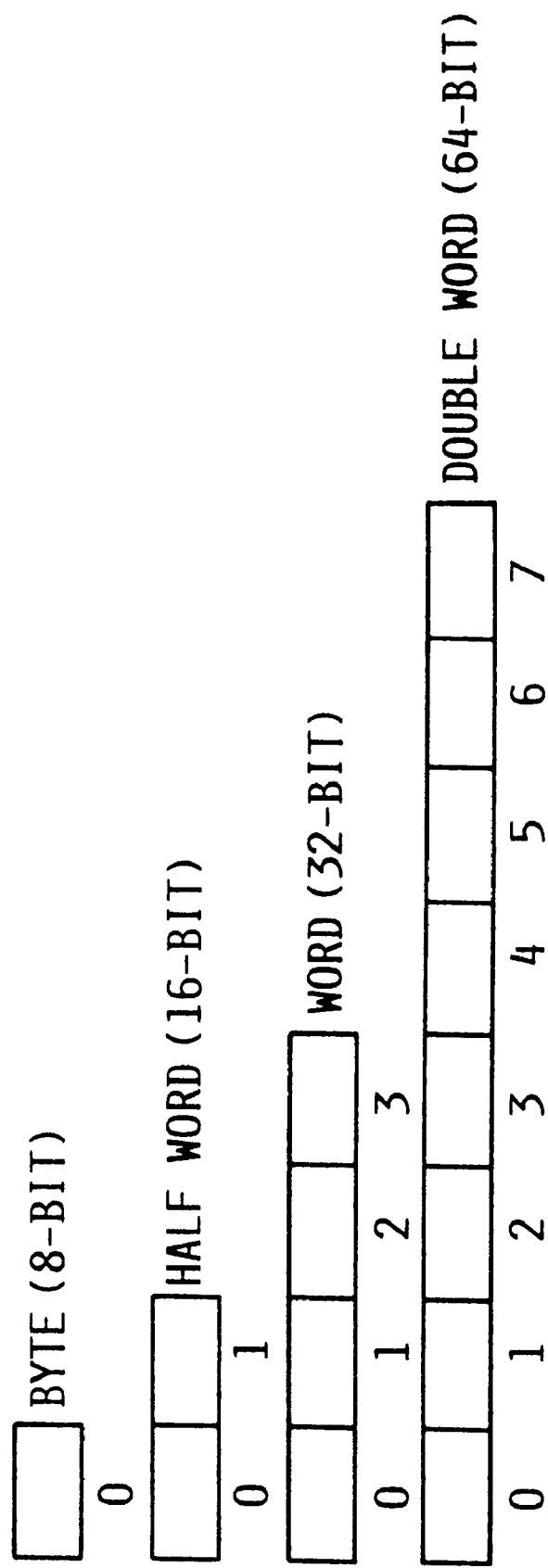

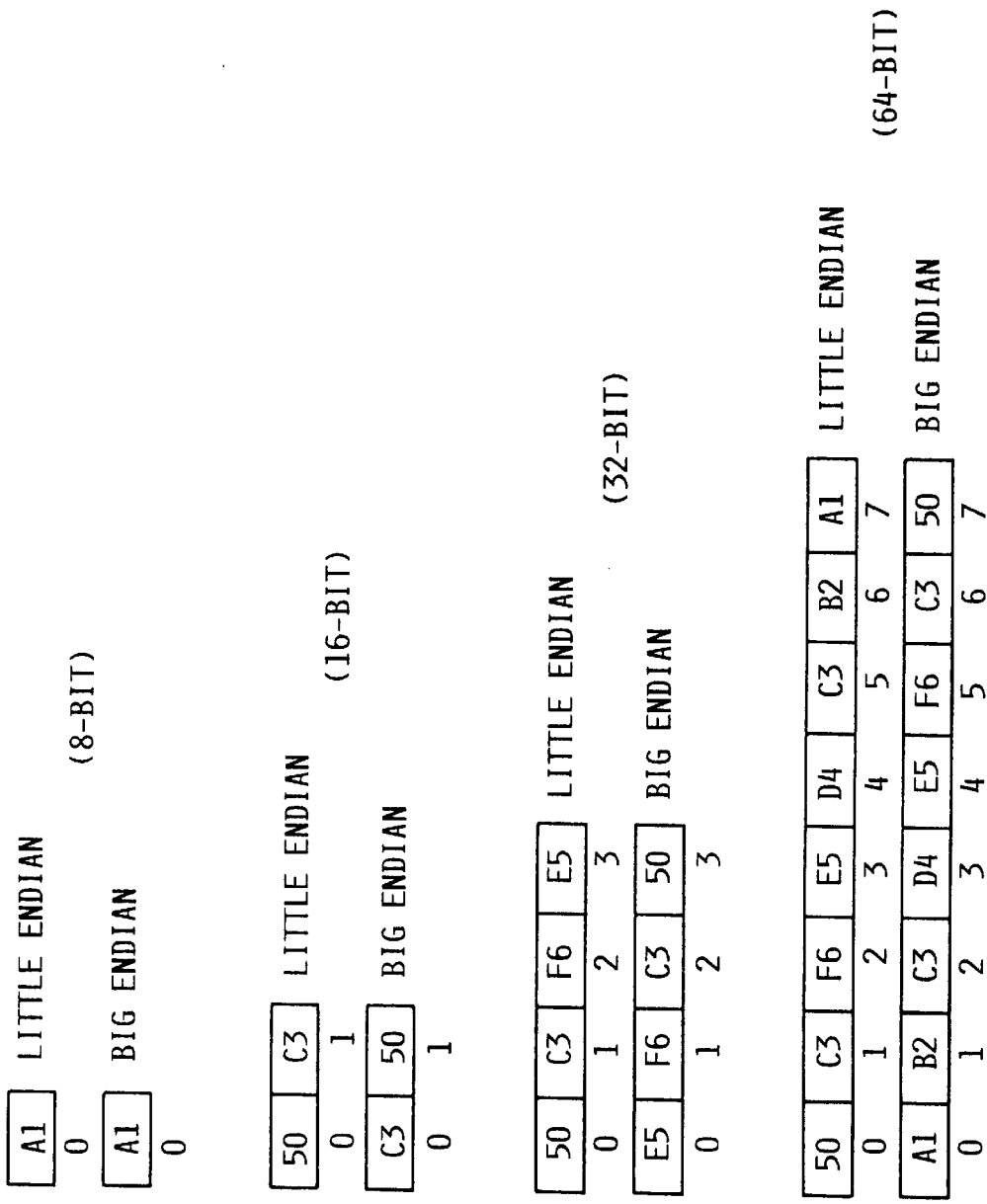

| WORD SIZE | ADDRESS MODIFICATION |
|---|---|
| BYTE (8-BIT) | XOR 7 |
| HALF WORD (16-BIT) | XOR 6 |
| WORD (32-BIT) | XOR 4 |
| DOUBLE WORD (64-BIT) | XOR 0 |

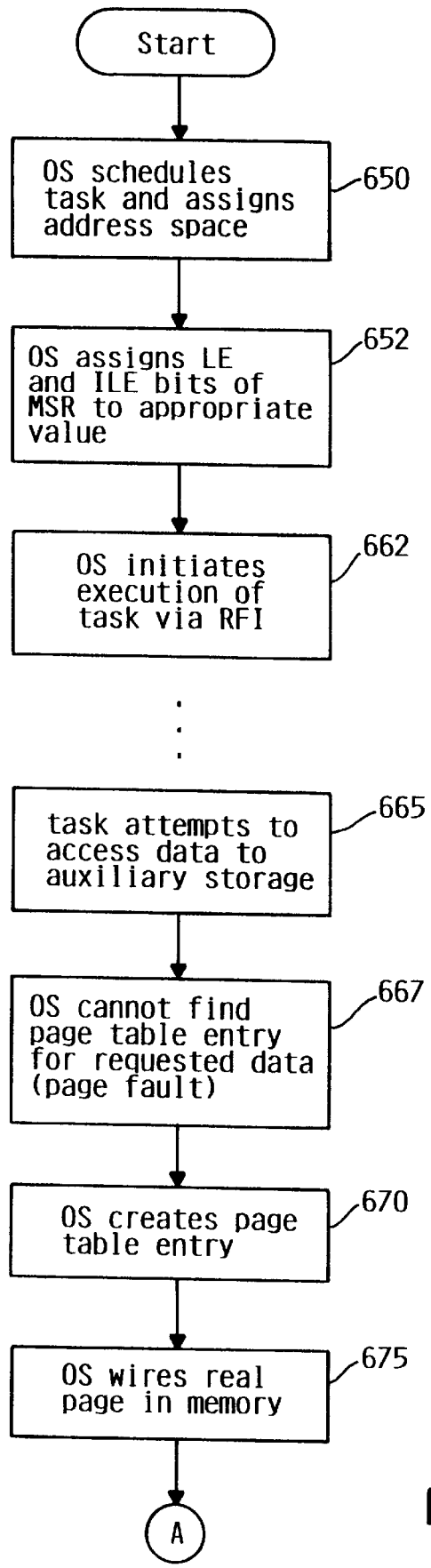
FIG. 6A-I

Segment Sharing of Virtual Address Segment 505 between two little endian tasks' address spaces

MIXED-ENDIAN COMPUTING ENVIRONMENT FOR A CONVENTIONAL BI-ENDIAN COMPUTER SYSTEM

REFERENCE TO PARENT APPLICATION

This application is a divisional of U.S. Ser. No. 08/393,968, filed on February 24, 1995 by Larry W. Loen et al., and entitled "A Mixed-Endian Computing Environment for a Conventional Bi-Endian Computer System," which is hereby incorporated by reference in its entirety.

FIELD OF THE INVENTION

The present invention pertains generally to the field of data processing, and more particularly to the field of endian oriented computer systems.

BACKGROUND OF THE INVENTION

The earliest digital computers built in the late 1940's had simple designs and components. Despite numerous advances in technology over the years, most modern day computers still use the same basic components to perform the same fundamental tasks of storing and manipulating information.

Two of these basic components are computer memory and a processor. Computer memory stores information being used by the computer, and works in much the same way as the memory of a person. For example, just as people can remember ideas about different topics and events, the memory of a computer system can be used to store words, numbers, pictures, and other forms of information. PATENT A computer processor is the active component of the computer system. The processor operates on the information stored in the computer system's memory to carry out the task assigned to the computer system. The tasks being processed by the computer system are also sometimes called jobs, programs, or processes.

A computer processor running a job reads and processes information stored in computer memory in much the same way a person reads and processes the words printed on the page of a book. Therefore, just as the arrangement of words on a page is important to human readers, the arrangement of information in the computer system's memory is important to the computer system. For example, words in English are written from left to right and words in Hebrew are written from right to left. People who read only English are able to understand English words that are written from left to right and people who read only Hebrew are able to understand Hebrew words that are written from right to left. The fact that English words are written on a page from left to right does not mean that it is better to arrange words in this manner instead of arranging them from right to left. English words are written from left to right simply because English readers expect words to be written from left to right. In this sense, the arrangement of information in the memory of a computer system is not different than the arrangement of words on a page. One way of arranging the information is not better than any other way of arranging the information. However, computer systems are also just like people in the sense that if the information is not arranged in a way that the computer system expects, the information cannot be understood by the computer system.

Of course, the fact that one way of arranging computer system information is not better than any other way of arranging the information has "opened the door" for different approaches to organizing information in computer system memory. It is no surprise, then, that computer system designers would at some point develop different schemes for organizing at least some forms of computer system information. One such divergence occurred some time ago for two particular forms of computer system information (called floating point information and binary integer information). At present, there are two common schemes for arranging these types of computer system information. The two schemes were dubbed "little endian" and "big endian" after the warring tribes from the famous book *Gulliver's Travels* written by Jonathan Swift. While the terms are colorful, they have no significance to computer systems beyond denoting how these types of information are arranged on a particular computer system.

In the late 1970's and early 1980's, INTEL CORPORATION introduced processors which became the standard for IBM PC and compatible personal computers. These computer systems used the so-called little endian arrangement. During this same time, other computer systems were designed using the so-called big endian arrangement. These later computer systems included processors manufactured by MOTOROLA Corporation and used in computer systems manufactured by APPLE Corporation.

In the past, the way computer systems organized information (in big or little endian format) within their memory was not a significant problem because it was not considered advantageous to arrange information in more than one way on a single computer system.

Today, however, the tremendous growth of computers used in businesses and homes has given rise to a serious need for compatibility between the different types of computer systems. For example, persons who use IBM PC or compatible computers cannot generally share computer programs and information with persons who use APPLE Macintosh computers, and vice versa. Large corporations which use both types of computers find it difficult to distribute information among employees. Small businesses often find that they cannot easily share information with suppliers or buyers who do not have the same type of computers. Consequently, computer software developers are often forced to devote additional time and resources to develop multiple versions of the same software so as to support different types of computer systems. In short, the inability to arrange certain types of information in more than one way on a single computer system has in large part resulted in delayed products, lost productivity, reduced efficiency, and increased capital expenditures.

Some existing computer systems do attempt to deal with the endian problem, but only in a limited fashion. These computer systems have what can be referred to as bi-endian capability. Essentially, bi-endian capability means that the same computer system can be made to execute either big endian tasks or little endian tasks, but not both types of tasks together. In other words, when the computer system is first started, the computer system is told whether it will be running big endian or little endian tasks (i.e., the computer system can be made to run in either big endian mode or little endian mode). Switching an existing bi-endian computer system's endian mode (i.e., big endian mode to little endian mode or vise versa) requires special purpose software that executes very early in the computer's initialization cycle (i.e., very close to start-up). Thereafter, all tasks will execute in the specified endian. For practical purposes, then, bi-endian computer systems are really equivalent to regular, "mono-endian," computer systems once they have completed their boot process.

While these bi-endian computer systems do provide additional flexibility by providing the ability to run either big endian or little endian tasks, they do not solve the problem associated with the need to allow tasks having different information format expectations (i.e., big versus little endian) to co-exist and execute, task for task, on a single computer system.

Without a computer system that can simultaneously run programs that have been created for little endian environments and others that have been created for big endian environments, the incompatibility problems of today will continue to plague the computer industry.

SUMMARY OF THE INVENTION

It is a principal object of this invention to provide an enhanced computer system that supports tasks of different endian without the need for reinitialization.

It is another object of this invention to provide an enhanced computer system that allows tasks having different information format expectations (i.e., big versus little endian) to co-exist and execute, task for task, on a single computer system.

It is still another object of this invention to provide an enhanced computer system that allows tasks having different information format expectations (i.e., big versus little endian) to co-exist and execute, task for task, on a single computer system without the need for specialized hardware.

It is yet another object of this invention to provide an enhanced computer system that allows big or little endian data to be stored on a single computer system such that it can be accessed by tasks that respectfully expect big or little endian data.

It is still another object of this invention to provide an enhanced computer system that be adjusted such that its input/output data flow is big endian biased or little endian biased.

It is still another object of this invention to provide an enhanced computer system that allows tasks having different information format expectations (i.e., big versus little endian) to co-exist and execute, task for task, on a single computer system without the need for specialized hardware while nonetheless allowing such tasks to access data formatted in the alternate endian.

A novel apparatus and method that allows tasks having different information format expectations (i.e., big versus little endian) to co-exist and execute, task for task, on a single computer system is disclosed herein. The computer system is referred to hereafter as a mixed-endian computer system.

The mixed endian computer system of the present invention is an enhancement to an existing bi-endian computer system. Mixed-endian mechanisms have been added that allow an existing bi-endian processor to change its endian mode dynamically. The mechanisms allow the mixed-endian computer system to change endian mode on a task by task basis if necessary. The mixed-endian mechanisms automatically format the data in the form expected by the running task, regardless of whether the task expects the data to be in big endian format or in little endian format. The mixed-endian mechanisms also format big and little endian instructions such that they can execute on the same computer system.

The mixed-endian computer system of the present invention is also equipped with a mechanism that allows the system to be adjusted such that its input/output (I/O) data flow is either big endian biased or little endian biased.

BRIEF DESCRIPTION OF THE DRAWINGS

FIG. 2a is a data diagram showing data word sizes used in the IBM PowerPC architecture.

FIG. 2b is a data diagram showing big endian and little endian data formats.

FIG. 6a-1, 6a-2 is a logic flow diagram of how the mechanisms of the present invention carry out steps of the preferred embodiment.

FIG. 6b is an example data flow diagram that shows example results of the steps taken by the mechanisms described in FIG. 6a.

FIG. 7b is an example data flow diagram that shows example results of the steps taken by the mechanisms described in FIG. 7a.

DESCRIPTION OF THE PREFERRED EMBODIMENT

Overview

Figure 1:
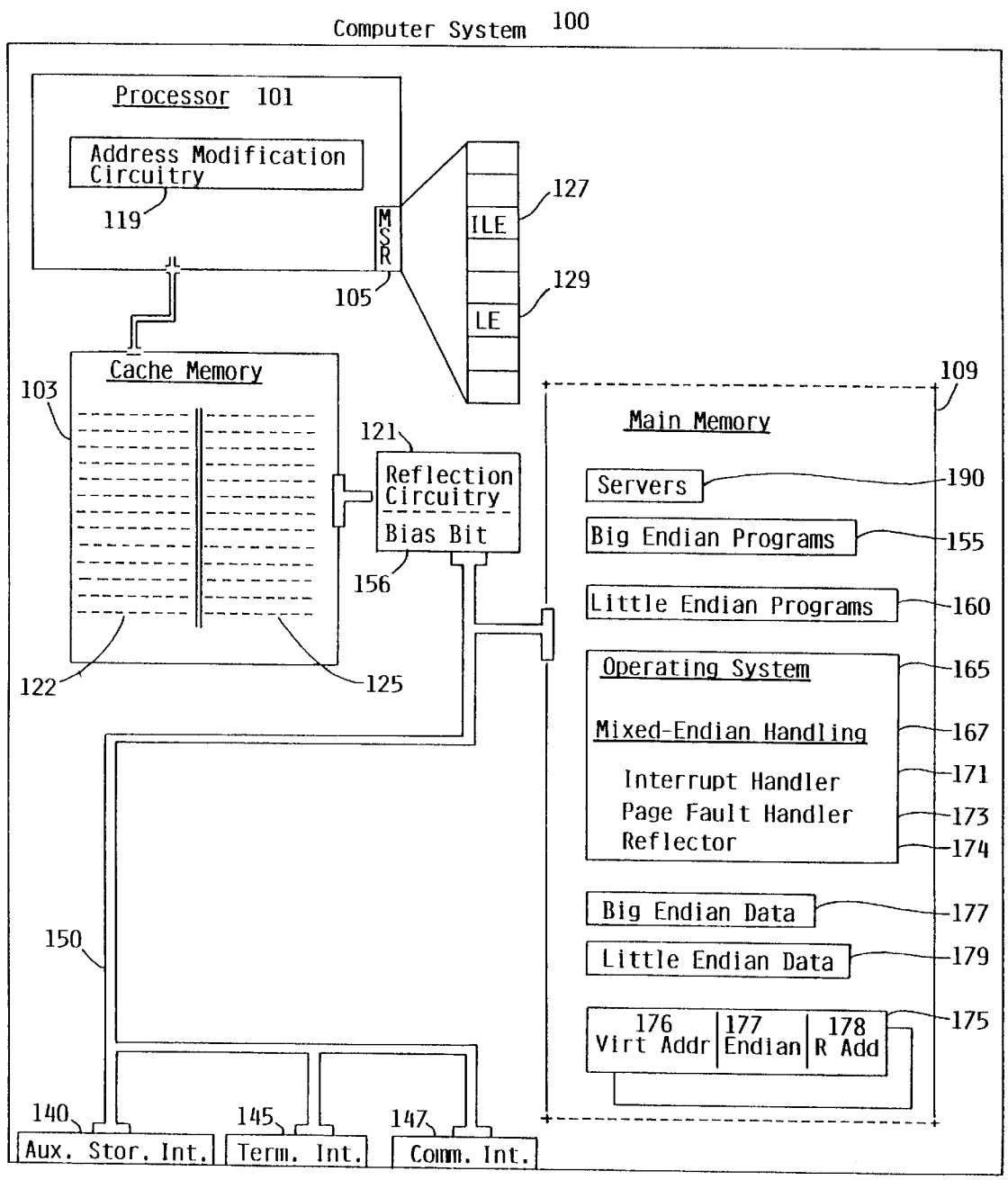
FIG. 1 is block diagram showing the computer system of the preferred embodiment.

As previously discussed, the present invention pertains to the storage and use of big and little endian information on a single computer system. More specifically, the present invention is an enhanced computer system that allows tasks, having different endian expectations (i.e., either big or little) to not only co-exist on a single computer system, but to execute, task for task, on a single computer system as well.

A basic overview of the problem and solution is presented here so that the reader can fully appreciate the benefits and advantages of the present invention. A more detailed description of the inner-workings of this invention can be found in the "Detailed Description" section of this specification.

As shown in FIG. 2b, the big endian data format involves storing the most significant byte of the word at the lowest memory address, the next most significant at the lowest plus 1, and so on. For example, a 32-bit integer representing a decimal value of 50,000 is stored in hexadecimal in ascending bytes as 0000C350, where address offset 0 is 00 and offset 3 is 50. By contrast, the little endian format involves storing the least significant byte is stored at the lowest memory address, the next least significant at the lowest plus 1, and so on. For example, a 32-bit integer representing a decimal value of 50,000 is stored in hexadecimal in ascending bytes as 50C30000, where address offset 0 is 50 and offset 3 is 00.

Because of the endian problem, computer programs written to run on a little endian machine typically will not run on a big endian machine, and vice versa. For example, it is currently difficult to design a program which will operate unmodified when originally compiled for one endian and recompiled for the other endian, even when fully standardized languages are used. This is because language standards do not specify the endian of the data and always use the underlying endian of the computer system they compile for. Since programmers often overlay a given piece of storage with an alternate definition, source code that redefines storage may have to change to produce the same results when the underlying endian changes for a different machine, as the following C code segment illustrates:

typedef struct {
    int a;
    short int b;
    char c[5];
  } example;
  example x;
  x.a=0x01020304;
  x.b=0x1112;
  strcpy(x.c,"\x21\x22\x23\x24");

On a little endian computer, information would be stored in memory as hexadecimal:

| offset | 0  | 1  | 2  | 3  | 4  | 5  | 6  | 7  | 8  | 9  | A  |
|--------|----|----|----|----|----|----|----|----|----|----|----|
|        | 04 | 03 | 02 | 01 | 12 | 11 | 21 | 22 | 23 | 24 | 00 |

On a big endian computer, the information would be stored in memory as hexadecimal:

| offset | 0  | 1  | 2  | 3  | 4  | 5  | 6  | 7  | 8  | 9  | A  |
|--------|----|----|----|----|----|----|----|----|----|----|----|
|        | 01 | 02 | 03 | 04 | 11 | 12 | 21 | 22 | 23 | 24 | 00 |

Now consider the following:

```
INT64 timestamp_whole;
typedef struct {
    INT32 upper;   /* time in seconds */
    INT32 lower;   /* the lower 32 bits of time (fraction of a second) */
} timestamp_split;
timestamp_split X = *(&(timestamp_split) timestamp_whole);
timestamp New;
New = X;
```

The data structure, "timestamp_split", is big endian because of how it overlays a 64-bit integer with two 32-bit integers. The setting of variables X and New only work correctly under big endian rules. In many time stamp formats, where the high order 32 bits are the time in seconds, the need to access the seconds conveniently necessitates such structures. However, any references to this data structure must be modified throughout the application if the program is moved to a little endian environment with a little endian timestamp. This is because the program above orders the words within a double word implicitly assuming big endian ordering, and this ordering remains in the same order, big endian dependent, even if recompiled for a little endian target machine, because timestamp_split formally describes the ordering as two adjacent four byte integers.

It is the encoding of ordering relationships of this kind, in many guises, which cause programs to have widely scattered dependency on the endian for which the program is first targeted. Unless carefully planned for in advance, programs developed on a system having one endian environment may be difficult and costly to port to a system having the other endian environment. Therefore, programs designed for execution on a system using one endian environment are rarely converted for execution on a computer system of the other environment.

For the purpose of illustration, a 32-bit word size is used throughout this overview, and corresponding portions of words are shown in FIG. 2a. It will be recognized, however, that computer systems utilizing other word sizes, such as 16-bit and 64-bit, may be used with the present invention without loss of generality.

As mentioned, some computer systems, called bi-endian computer systems, are able to change their external endian mode. Internally, however, a bi-endian computer system can be viewed as a computer system that is biased toward one particular endian, while at the same time including circuitry that provides the alternate endian mode. This circuitry is initialized by special purpose software to control the endian mode of the computer system. When the circuitry is initialized to operate in the alternate endian mode, reflection of the data takes place. The need for reflection is simply a consequence of how the bi-endian computer system handles the difference between big and little endian data formats. Therefore, once a bi-endian computer system is up and running, reflection either always occurs or never occurs, depending of course on whether the computer system has been told to run in its alternate endian mode.

The preferred processor of the present invention is an enhanced IBM PowerPC processor. The PowerPC architecture is described in the PowerPC Architecture Manual, May, 1993, IBM Corporation, Pub. No. SR28-5124-00, which is herein incorporated by reference. The bi-endian processors of the PowerPC (e.g., the Model 620) family are biased toward big endian. While a PowerPC bi-endian processor has been chosen for the preferred embodiment, those skilled in the art will appreciate that the present invention is not limited to any particular bi-endian processor and that the present invention is not limited to any particular endian bias.

Because IBM bi-endian PowerPC processors are biased toward big endian, they handle little endian tasks via a two step process. The first step is the aforementioned reflection. The reflection step essentially rearranges the data such that it can be accessed correctly given the big endian bias of the processors. The second step, called address modification, converts the addresses used to reference the data from big endian addresses to little endian addresses. At this point, it should be reiterated that the present invention is not limited to any particular endian bias. Accordingly, it should be understood that present invention applies equally to any bi-endian processor that, because of a little endian bias, handles big endian tasks through some type of reflection and address modification.

As has been discussed, there are two possible endian situations that exist when running in a mixed-endian processing environment. The first possibility is where the internal endian of the processor matches that of the software task. In this case, no conversion of software data is required, since the data byte order and data address offset can be read directly by the processor. The second possibility is where the internal endian of the processor does not match that of the software task. In this latter case, the aforementioned two-step process is used within PowerPC computer systems. These steps are illustrated in the tables shown as FIGS. 3a and 3b. The first step is a reflection which must be performed on the bytes comprising the data double word or fragment thereof (see FIG. 3a). The second step is a modification of the memory address offset of the bytes comprising the data double word to accommodate the new location of the bytes after the reflection that was performed in the first step (see FIG. 3b).

The reflection step may be performed in a variety of places, and is entirely mechanical and unrelated to the data element size being fetched. The reflection starts from storage which is presumed to be in the "true" endian format of the alternate endian and is then reflected. The reflection is based on its relative offset within a virtual addressed page, a real addressed page, or an associated cache line as an aligned double word or as a well-defined fragment thereof, as part of the fetch or store along the fetch/store data pathway prior to the second step of address modification. Referring to the table shown in FIG. 3a, byte 0 is exchanged with byte 7, byte 1 is exchanged with byte 6, byte 2 is exchanged with byte 5, and byte 3 is exchanged with byte 4. The result is that storage has now been changed from one endian to the other, but is residing at a different offset than expected by the programmer. It will be recognized that other reflections for word sizes other than 64-bits may be performed with the present invention without loss of generality.

Figures 3A, 3B:
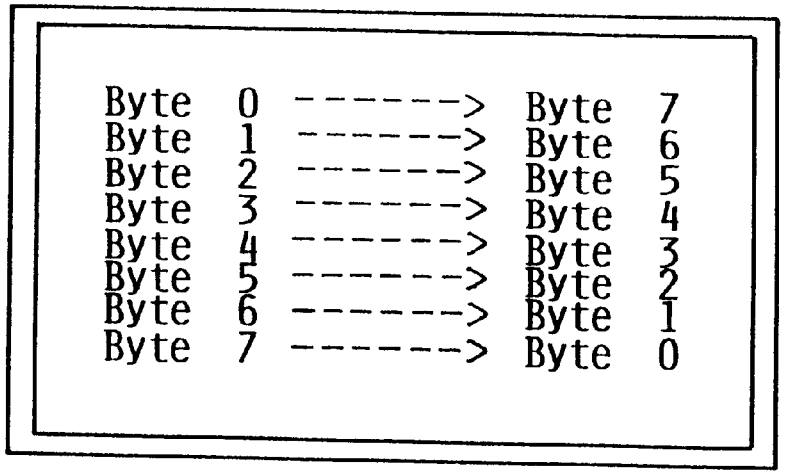
FIG. 3a is a table showing how data is reflected in the IBM PowerPC architecture.
FIG. 3b is a table showing how little endian addresses are modified in the IBM PowerPC architecture.

The reflection shown in FIG. 3a and performed by mechanisms of the present invention is sometimes referred to as double word reflection, but whenever the word "reflection" appears without qualification it should be taken to refer to the double word reflection shown in FIG. 3a.

The second step performs an address modification which depends on the size of the data word which is being referenced by the processor. Referring to FIG. 3b, a preferred system performs an Exclusive-or (XOR) 7 operation during a 8-bit byte memory reference, an XOR 6 operation during a 16-bit half word memory reference, an XOR 4 operation during a 32-bit word memory reference, and an XOR 0 operation during a 64-bit memory reference. In the preferred embodiment of the present invention for either a 16-bit, 32-bit, or 64-bit word processor, the address offset modification is generalized by performing an appropriate XOR operation on the three least significant bits of the address offset.

FIGS. 4a through 4d show conversions from little endian to big endian format for the following example:

```
typedef struct {
  INT32 word;
  INT16 hword;
  BYTE byte;
  BYTE end;
} demo;
demo x;
x.word=0x0000C350;
x.hword=0xF1F2;
x.byte=0xA1;
x.end=0x00;
```

Figure 4A:
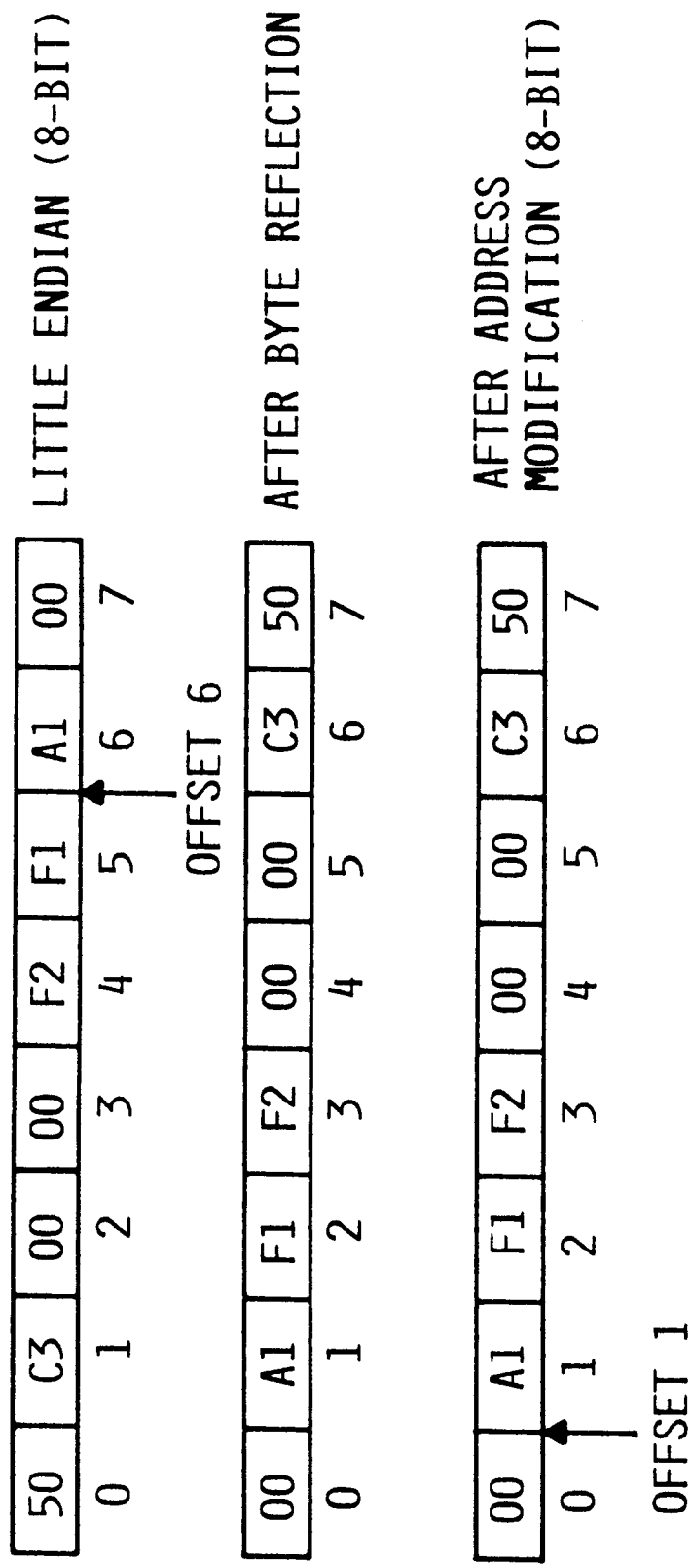
FIG. 4a is a data diagram showing how an 8-bit data item is fetched via the two-step little endian process used in bi-endian, PowerPC computer systems.
Figure 4B:
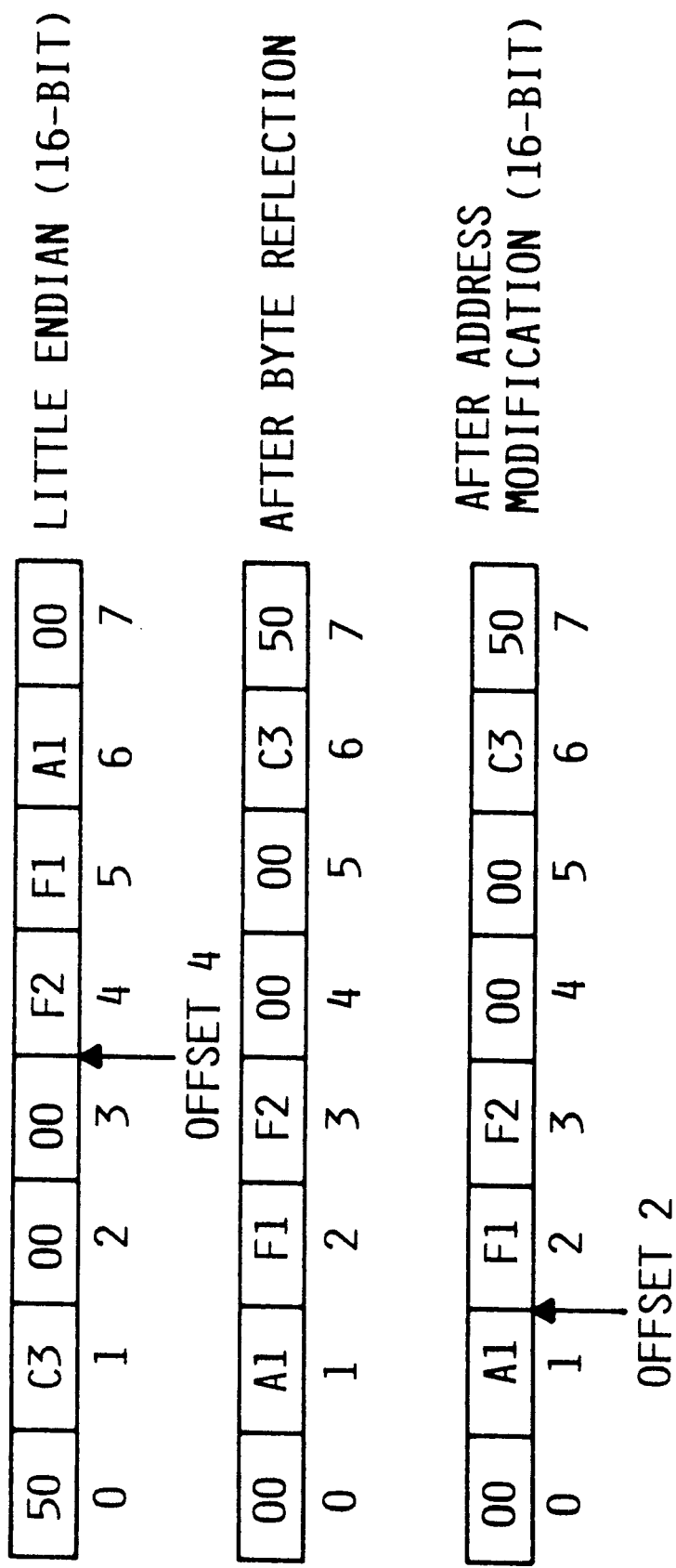
FIG. 4b is a data diagram showing how an aligned 16-bit data item is fetched via the two-step little endian process used in bi-endian, PowerPC computer systems.
Figure 4C:
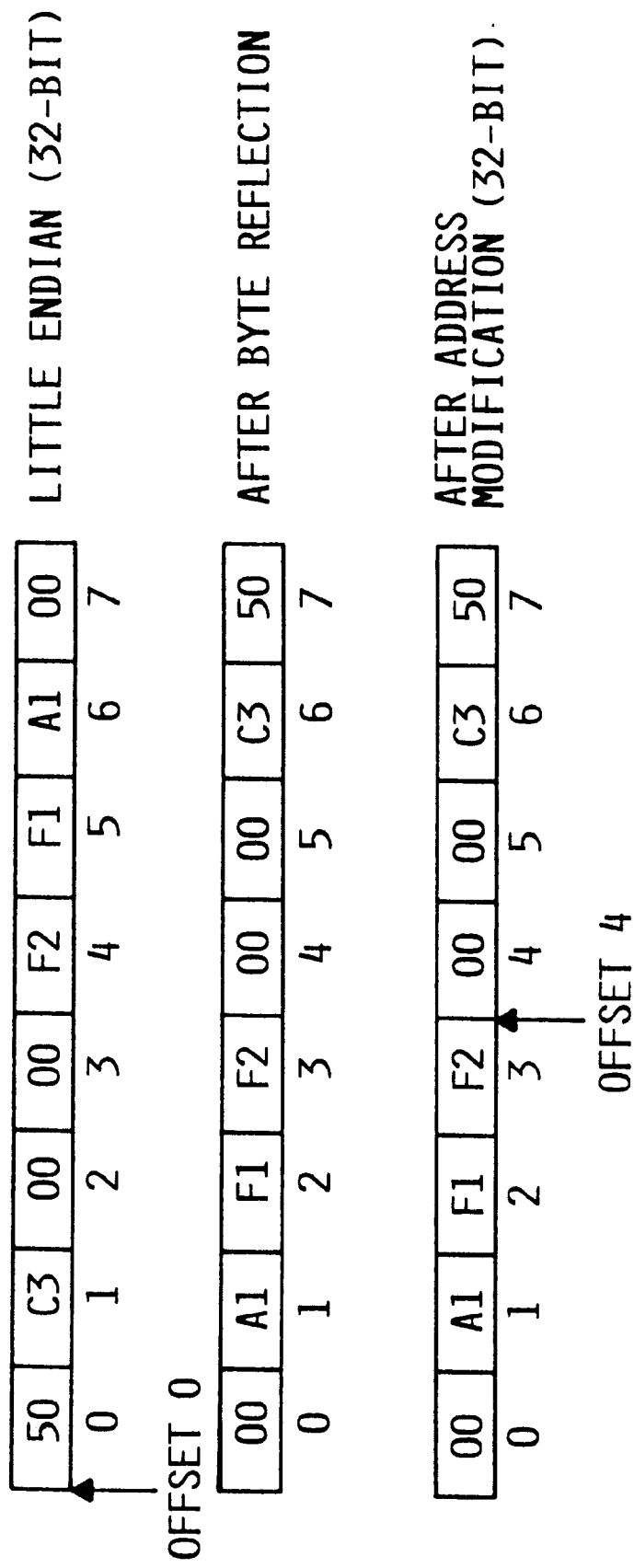
FIG. 4c is a data diagram showing how an aligned 32-bit data item is fetched via the two-step little endian process used in bi-endian, PowerPC computer systems.
Figure 4D:
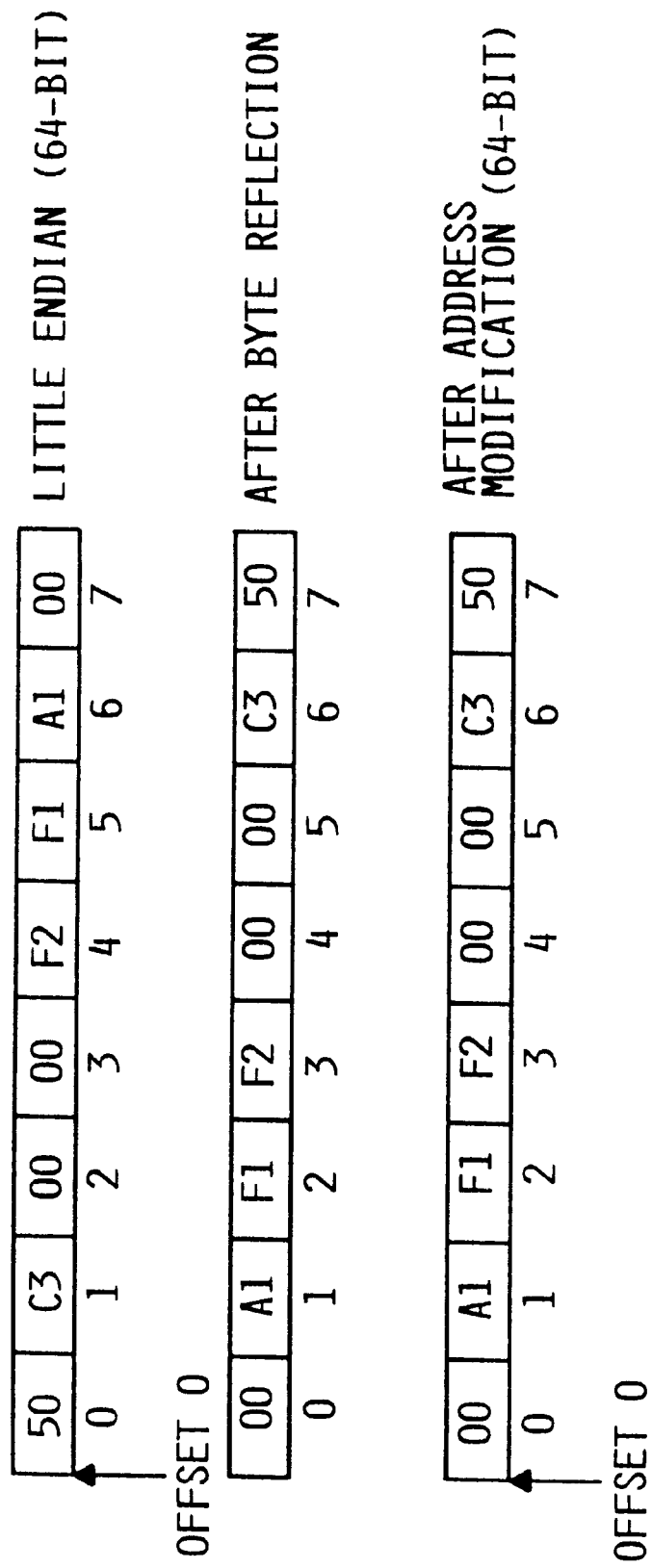
FIG. 4d is a data diagram showing how an aligned 64-bit data item is fetched via the two-step little endian process used in bi-endian, PowerPC computer systems.

For example, in FIG. 4c, a 32-bit word is shown reflected from little endian format to big endian format and its location has changed from offset 0 to offset 4 during a 32-bit word fetch. To complete the processor fetch from memory, an address modification is performed on the address as originally presented by the software. In this case, the fetch of a 32-bit word, the original address has an offset of 0. The processor takes the presented address and performs an XOR 4, which fetches the corresponding big endian word from offset 4. It will be recognized that by performing an XOR 7 for 8-bit byte memory reference, an XOR 6 operation during a 16-bit half word memory reference, an XOR 4 operation during a 32-bit word memory reference, and an XOR 0 operation during a 64-bit memory reference, that storage that began in little endian format before the first step and is first reflected as described above, corrects the original offset from what the original software specified to an internally correct offset to account for the reflection. Since these steps are hidden by PowerPC computer systems, a programmer cannot tell that the environment is anything other than true little endian. Additional examples of the two-step conversion process from little endian to big endian format, corresponding to 8-bit, 16-bit, and 64-bit memory references, are given in FIGS. 4a, 4b, and 4d.

Figure 5:
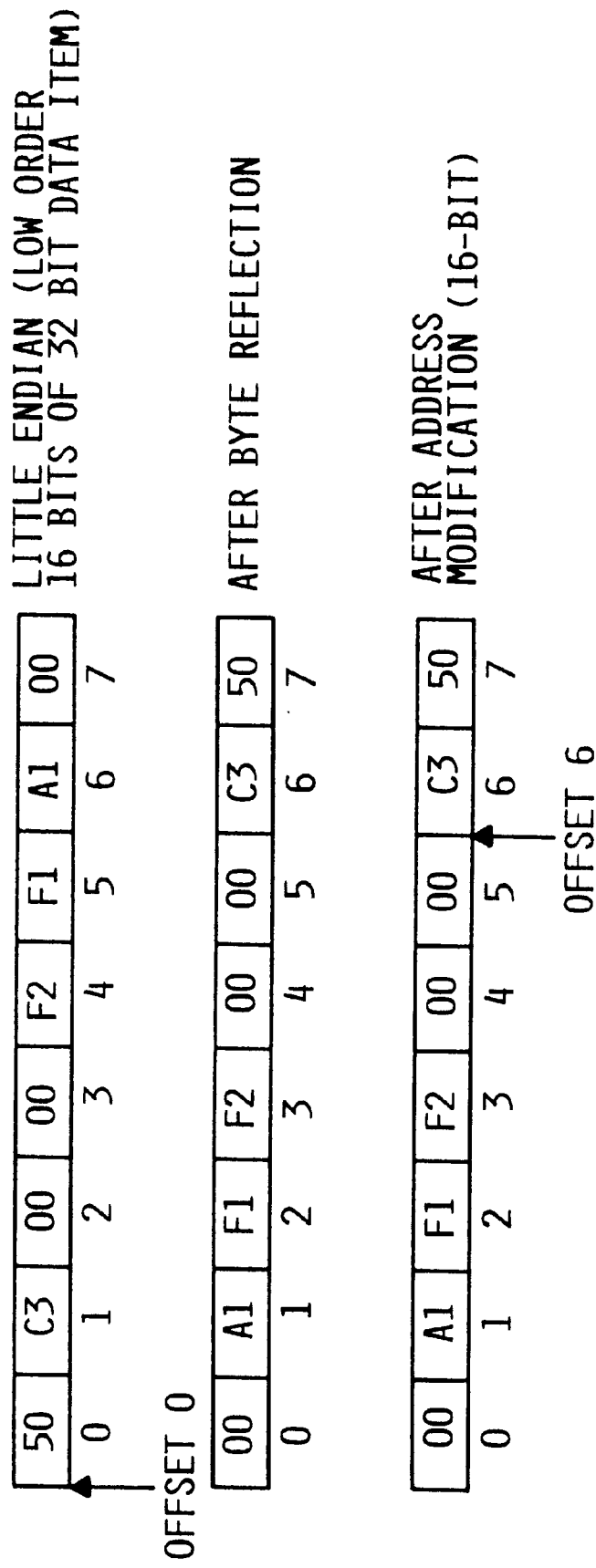
FIG. 5 demonstrates how the low order 16 bits of a 32-bit little endian integer may be fetched via the two-step little endian process used in bi-endian, PowerPC computer systems.

The PowerPC two-step conversion process described above also accommodates partial data reads. For example, FIG. 5 shows a fetch of the low order 16 bits, C3 50, of the 32-bit integer, 00 00 C3 50. Because the 32-bit integer is little endian, the software normally fetches the halfword at offset 0, using standard little endian rules. The 16-bit memory reference of the 32-bit word is accommodated by first reflecting the 32-bit word from little endian format to big endian format, as previously described in FIG. 4c. Because the current memory reference is for a 16-bit value, an XOR 6 is then performed as described in FIG. 3b, which fetches the correct big endian halfword from offset 6.

It will be recognized that the above description of an address offset modification is correct for word sizes of 16-bits, 32-bits, 64-bits, and extends readily to other word sizes. For example, a processor having a 128-bit word size performs a 16-byte word reflection in the first step, where byte 0 is exchanged with byte 15, byte 1 is exchanged with byte 14, byte 2 is exchanged with byte 13, byte 3 is exchanged with byte 12, byte 4 is exchanged with byte 11, byte 5 is exchanged with byte 10, byte 6 is exchanged with byte 9, and byte 7 is exchanged with byte 8. During the second step, the processor performs an XOR operation on the four least significant bits of the address offset, using in hexadecimal an XOR F for an 8-bit reference, an XOR E for a 16-bit reference, an XOR C for a 32-bit reference, an XOR 8 for a 64-bit reference, and an XOR 0 for a 128-bit reference.

One complexity involved in creating a mixed-endian computing environment on a conventional bi-endian computer system the difficulty associated with managing the image of main memory in the face of the data and address adjustments that are imposed by conventional bi-endian architectures. The present invention provides mechanisms that manage main memory such that tasks having different information format expectations (i.e., big versus little endian) can co-exist and execute, task for task, on a single computer system. More specifically, the mechanisms of the present invention control and track the data reflection aspect of the PowerPC architecture by marking data to indicate whether the data has been reflected or not as the data moves through the various stages of processing.

In a first alternate embodiment, the present invention provides a mechanism that allows existing PowerPC computer systems to be biased in favor of a little endian I/O data flow instead of the standard I/O bias, which favors a big endian data flow. Standard PowerPC computer systems are considered to have a big endian biased I/O flow because data requested by a little endian task is always required to be reflected when brought from auxiliary memory into main memory, while data requested by a big endian task is simply required to be copied by direct memory access (DMA) directly into main memory.

One possible solution is to use specialized I/O DMA hardware that copies big endian data directly into main memory, while reflecting little endian data before copying it into main memory. The mechanisms of this embodiment, however, use standard, off-the-shelf, I/O DMA hardware that copies information, byte by byte from auxiliary storage into main memory.

To change the I/O bias of an existing PowerPC computer system, while not altering the data format seen by PowerPC processor 101, the mechanisms of the first alternate embodiment cause little endian data to be copied directly into main memory and cause big endian data to be reflected prior to being stored in main memory. Then, when the data is eventually moved between main memory and cache memory, it is always reflected in the manner set forth in FIGS. 3a–5, regardless of whether the data is known to be little endian data or big endian data.

The result is that the data image in cache memory corresponds exactly to PowerPC requirements for either big or little endian processing because the second reflection negates the net effects of the first reflection for big endian processing while providing the one net reflection needed for little endian processing.

DETAILED DESCRIPTION

FIG. 1 shows a block diagram of the computer system of the present invention. The computer system of the preferred embodiment is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. As shown in the exploded view of FIG. 1, computer system 100 comprises processor 101 connected to system bus 150 via cache memory 103 and reflective circuitry 121. Main memory 109, reflection circuitry 121, auxiliary storage interface 140, terminal interface 145, and communications interface 147 are also shown to be connected to system bus 150.

Processor 101 comprises address modification circuitry 119, and machine state register (MSR) 105. Processor 101 is an enhanced IBM bi-endian Power PC processor; however, any two step, bi-endian processor could be used. Address modification circuitry 119 is responsible for performing the address modification of FIG. 3b; however, its function could also have been implemented in software. MSR 105, which contains current task information associated with processor 101, also contains little endian (LE) status bit 129 and interrupt little endian (ILE) status bit 127. LE bit 129 indicates whether an address modification should be performed during a memory reference. The value of LE bit 129 is set by operating system 165 to reflect the endian of the current task running on processor 101. In the mixed endian environment of the present invention, the value of LE bit 129 varies in real time as software tasks of different endian execute on processor 101.

ILE bit 127 indicates the state LE bit 129 is to become upon receiving a processor interrupt. ILE bit 127 reflects the endian chosen for the software interrupt handler. The change of endian, if any, must be part of the interrupt process when changing from that of an application program endian (i.e. big endian programs 155 or little endian programs 160) to the interrupt handling endian. The value of ILE bit 127 is preferably only required to be set once by the operating system upon initial start-up of computer system 100 to reflect the choice of the interrupt handler endian. The value of ILE bit 127 typically does not change in real time because the endian bias of the interrupt handler typically does not change after initial start-up. It is possible to permanently fix the value of the ILE bit 127 to a constant value without loss of generality. However, this would have the side-effect of forcing the interrupt handler, and possibly the system software, to be of a particular endian.

Cache memory 103 comprises cache arrays 123 and 125. Cache memory 103 is a two way associative, copy-back cache; however, those skilled in the art will appreciate that the present invention is not limited to any particular cache mechanism. Cache arrays 123 and 125 each contain a plurality of cache array elements. As is known in the art, each cache array element contains a cache line, which contains the actual data, and certain control information.

Reflection circuitry 121, which contains bias bit 156, is capable of performing a reflection of data read from main memory 109 into cache memory 103, as described in the overview section of this specification and in FIGS. 3a through 5. Those skilled in the art will recognize that it is possible to implement reflection circuitry 121 in software running on the cache memory controller associated with cache memory 103 (not shown) without loss of generality. Bias bit 156, which is preferably set once early in the initialization cycle of computer system 100, is used to set the I/O bias of computer system 100. While it is possible to permanently fix the value of the bias bit 156 without loss of generality, this would have the side-effect of forcing computer system 100 to always maintain a specific I/O bias regardless of whether the population of tasks executing on computer system 100 changed from one endian to another.

Main memory 109, which is that known in the art as paged memory, contains big endian programs 155, little endian programs 160, servers 190, operating system 165, and other programs (not shown). Big endian programs 155 are programs that are designed to expect and operate with big endian data 177, while little endian programs are designed to expect and operate with little endian data 179. In special cases, however, programs can be designed to expect and operate with data of the alternate endian.

Operating system 165, which is further shown to contain mixed-endian handling mechanisms 167, is an enhanced IBM MicroKernel based, multi-tasking operating system; however, any appropriate multi-tasking operating system could be used. Mixed-endian handling mechanisms 167 comprises interrupt handler 171, page fault handler 173, and reflector 174. Mixed-endian handling mechanisms 167 are essentially responsible for dynamically controlling and tracking the two step process of PowerPC processor 101. However, those skilled in the art will appreciate that the spirit and scope of the present invention is not limited to the specific two step process that is used in bi-endian, PowerPC computer systems. Indeed, the mechanisms disclosed herein are equally applicable to any adjustment of data and addresses, regardless of the number or specifics of the steps taken.

Main memory 109 also contains big endian data 177, little endian data 179, and page table entries 175. Each of page table entries 175 comprises, amongst other things, a virtual address (e.g., virtual address 176), an endian bit (e.g., 177), and a real address (e.g., real address 178). There is one page table entry for each memory page currently in memory 109.

The endian bits 177 contained in page table entries 175 denote the endian of the page (i.e., 1 for little endian and 0 for big endian).

Auxiliary storage interface 140 is used to interface computer system 100 with auxiliary storage devices such as magnetic or optical storage devices.

Terminal interface 145 allows system administrators and computer programmers to communicate with computer system 100, normally through programmable workstations.

Communications interface 147 is used to interface computer system 100 with external communications networks such as local area networks (LANs) and wide area networks (WANs). Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bidirectional communication could be used.

Mixed-Endian Operation
Primary Embodiment—General

Figures 2, 6A:
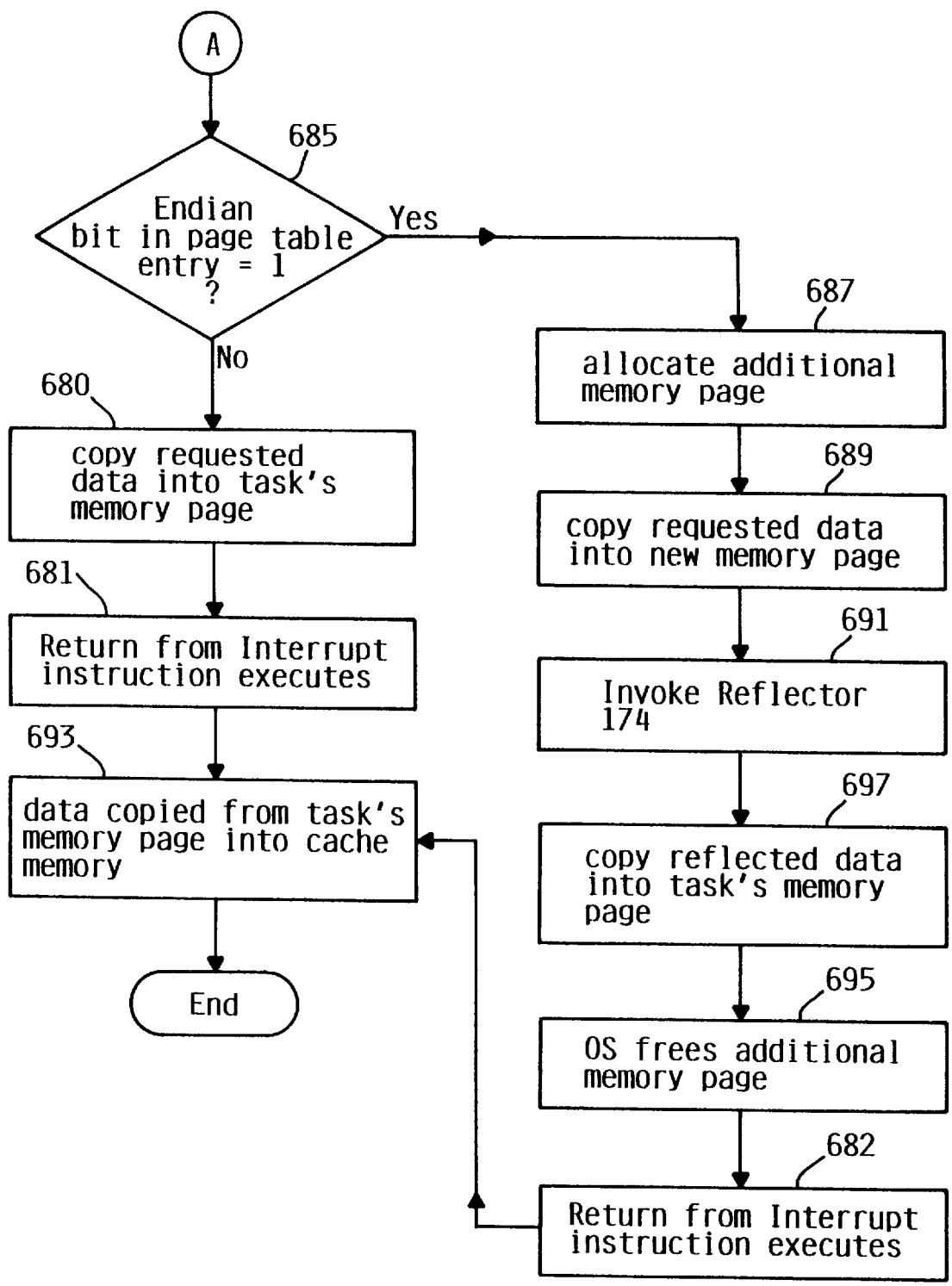
Figure 6B:
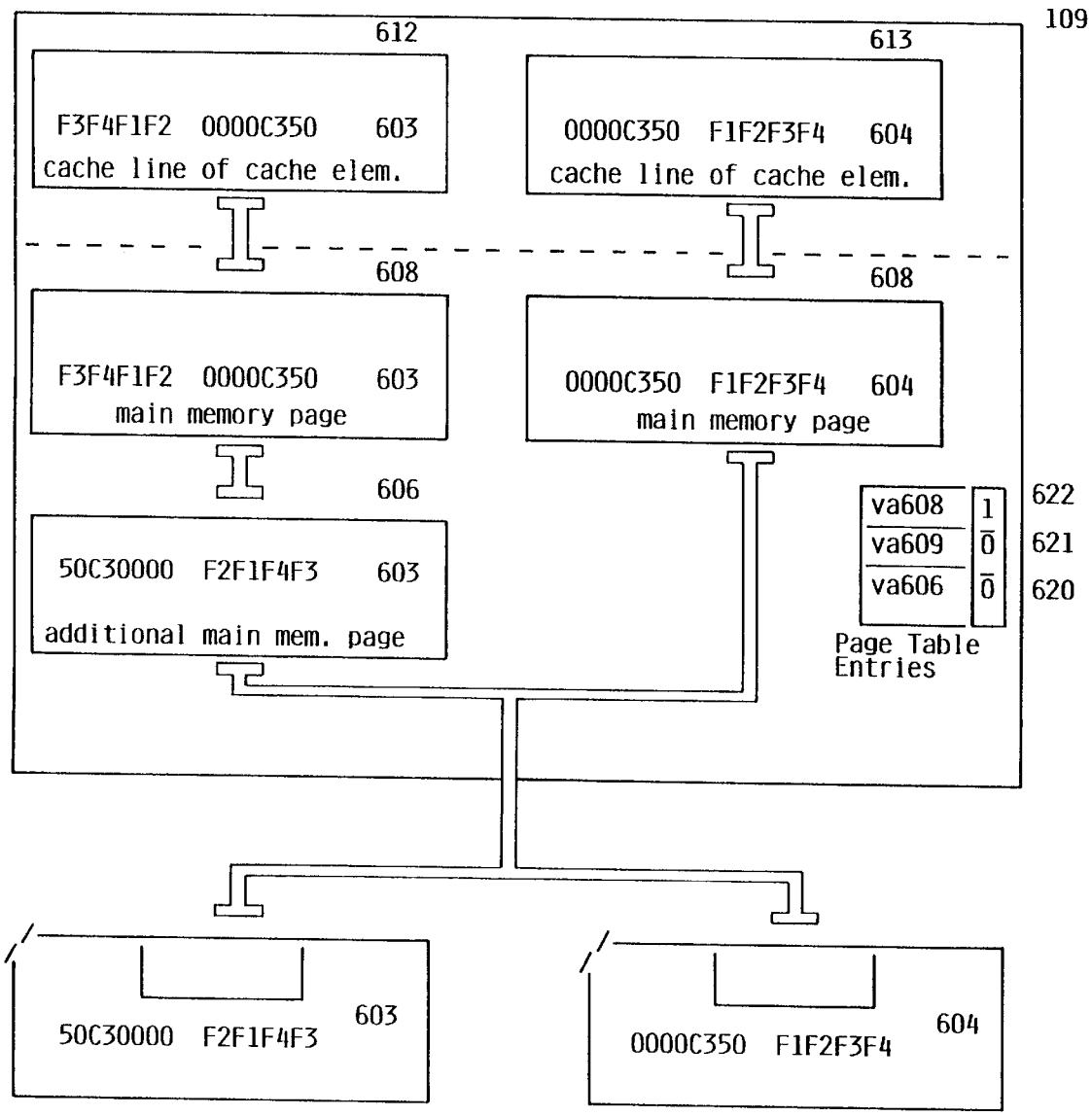

FIG. 6a is a logic flow diagram of how the mechanisms of the present invention carry out steps of the preferred embodiment. FIG. 6b is an example data flow diagram that shows example results of the steps taken by the mechanisms described in FIG. 6a.

In block 650, operating system 165 schedules a previously created task for execution on processor 101 and assigns an address space to the task. The address space is marked to indicate the endian of its associated task. The present invention uses a "single-aliased" form of shared addressing. Single aliasing is explained in the text associated with FIGS. 8a–8d. Prior to any fetch or data store operation, operating system 165 creates the particular task and its associated task control block (TCB). Since those skilled in the art are familiar with task creation, the details of such steps are not set forth herein. Operating system 165 then initiates execution of the scheduled task [block 662]. Because the task scheduling function of operating system 165 is itself an interrupt handler of sorts, the task scheduling function initiates execution of the task via a Return From Interrupt instruction (RFI). An instruction such as RFI is known in the art to be the last instruction of an interrupt handler. The RFI of the present invention includes two operands. The first operand contains the new values of MSR 105 and the address within the task that is to be executed first when the interrupted task (i.e., the task to be scheduled in this case) resumes execution. The new values of MSR 105 (i.e., new LE bit 129 and new ILE bit 127) are respectively derived from the TCB's endian bit and the current value of LE bit 129 (i.e., that of operating system 165).

For the purposes of explanation, assume that the requesting task attempts to access data currently stored in auxiliary storage via auxiliary storage interface 140 [block 665]. Under this assumption, the running user-state task, when referencing the data, will suffer a page fault interrupt. Since operating system 165 is careful in the aforementioned RFI to get ILE bit 127 to the endian value of operating system 165, it gets control in its own endian, with the values of old MSR 105, the interrupted instruction's address, and the address having the page fault all available as per PowerPC architecture requirements. When operating system 165 attempts to associate the virtual address presented by the requesting task (i.e. the address of the requested data) with one of page table entries 175 (i.e., by determining that the presented address is within a particular memory page), it determines that the requested information is not currently present in main memory 109. Therefore, a page fault is confirmed in block 667. Operating system 165 then assigns a page of main memory 109 to the requesting task and creates an appropriate page table entry [block 670]. Amongst other things, the page table entry contains the virtual and real addresses of the memory page and the endian bit of the requesting task. The endian bit of the address space is incorporated in the page table entry by operating system 165 through reference to the running task's TCB. Once this step is complete operating system 165 "wires" or locks the page into main memory 109 such that it cannot be swapped out before the data access can complete [block 675].

In block 685 of FIG. 6a, operating system 165 determines whether the requested page is big or little endian page. At this point, the mechanisms of the present invention perform different operations depending on the endian of the requested page. FIG. 6b shows an example of how big and little endian data is respectively loaded for big and little endian pages. Consider first the example of a big endian task requesting big endian data 604. Big endian data 604 is shown to be stored in auxiliary storage as HEX 000C350 F1F2F3F4. Since block 685 is answered negatively by checking page table entry 621, operating system 165 proceeds to block 680 where it would cause big endian data 604 to be copied (i.e., by DMA) directly into memory page 609 of main memory 109.

Once this step is complete, the interrupted instruction is again resumed via an RFI instruction [block 681]. The interrupted instruction will typically immediately attempt to access the recently "paged-in" data. This causes big endian data 604 to be copied directly into a cache line of one of cache array elements 123 or 125 [block 693].

By contrast, consider now the example of little endian data 603 fetched by a little endian task. Little endian data is shown on FIG. 6b as HEX 50C30000 F2F1F4F3. Little endian data 603 is the little endian form of big endian data 604 (i.e., each piece of data means the same thing, they are just stored differently). Processing from 650 to 675 is similar to the big endian case, except the TCB and the address space, are marked little endian and the page table entry of block 670 is accordingly set to little endian. In this example, block 685 is answered affirmatively by checking page table entry 622. Therefore, operating system 165 proceeds to allocate additional memory page 606 [block 687]. Operating system 165 then causes little endian data 603 to be copied directly (i.e., by DMA) into additional memory page 606 [block 689]. Operating system 165 then invokes reflector 174 in block 691. Reflector 174 performs an in-place reflection of little endian data 603, per the PowerPC rules described in FIGS. 3a through 5 and the accompanying text. Once little endian data 603 has been reflected, it is copied directly into main memory page 608 [block 697]. At this point, an RFI instruction is similarly performed and control returns (in the correct endian) to the interrupted little endian task. Again, the task will typically execute the interrupted instruction immediately upon resuming execution. This cause data 603 at 608 to be copied into a cache line of one of cache array elements 123 or 125 [block 693].

Thus, the data is available in cache memory 103 for access by the requesting task. Note, however, that the respective data appears in cache memory 103 in the appropriate format (i.e., reflected in case of little endian data and unreflected in the case of big endian data), regardless of whether the running task happened to be a big endian or little endian task. This will be further amplified in the single aliasing discussion later described.

Alternate Embodiment—Little Endian I/O Bias

Figure 7A:
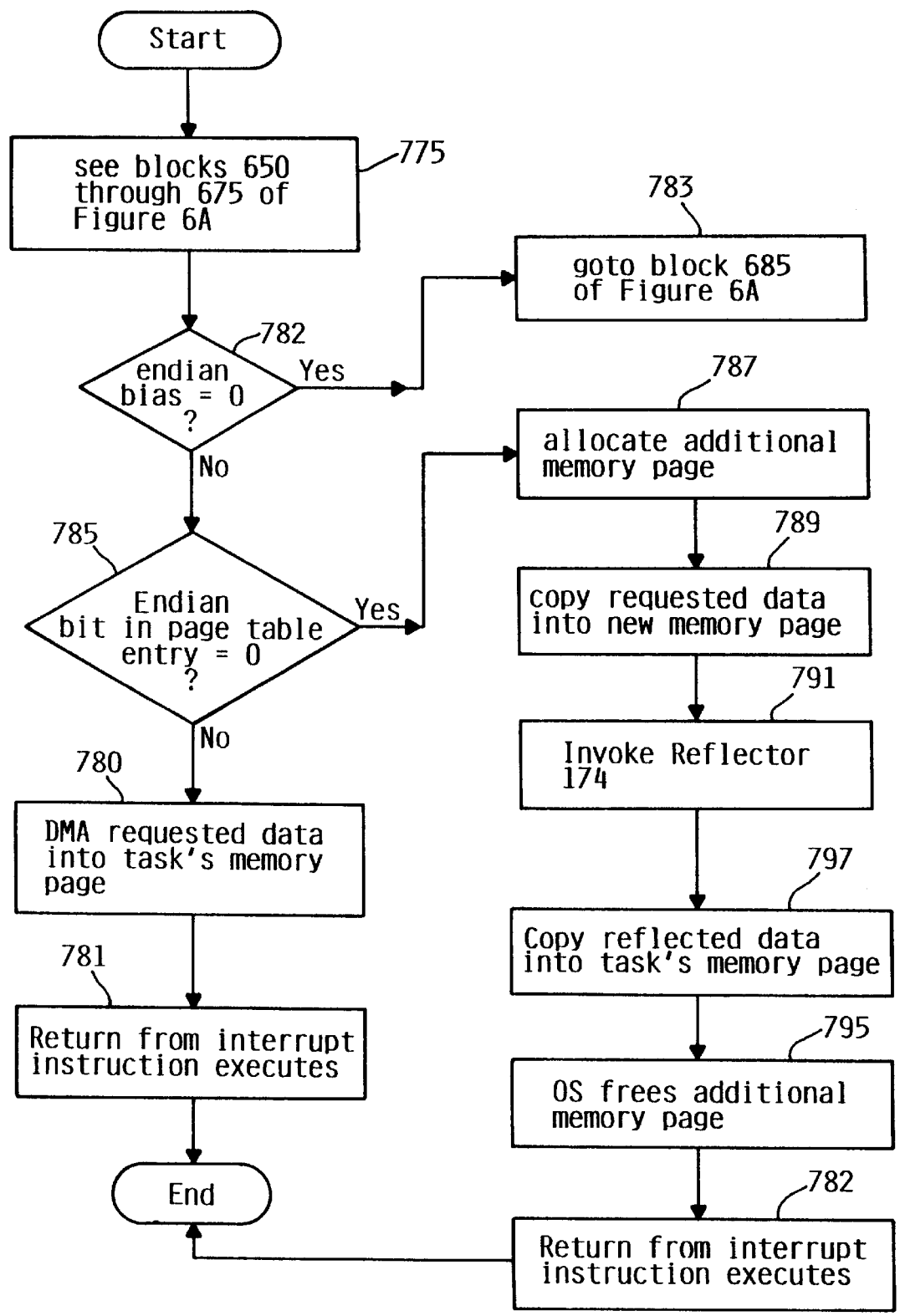
FIG. 7a is a logic flow diagram of how the mechanisms of the present invention carry out steps of this alternate embodiment.
Figure 7B:
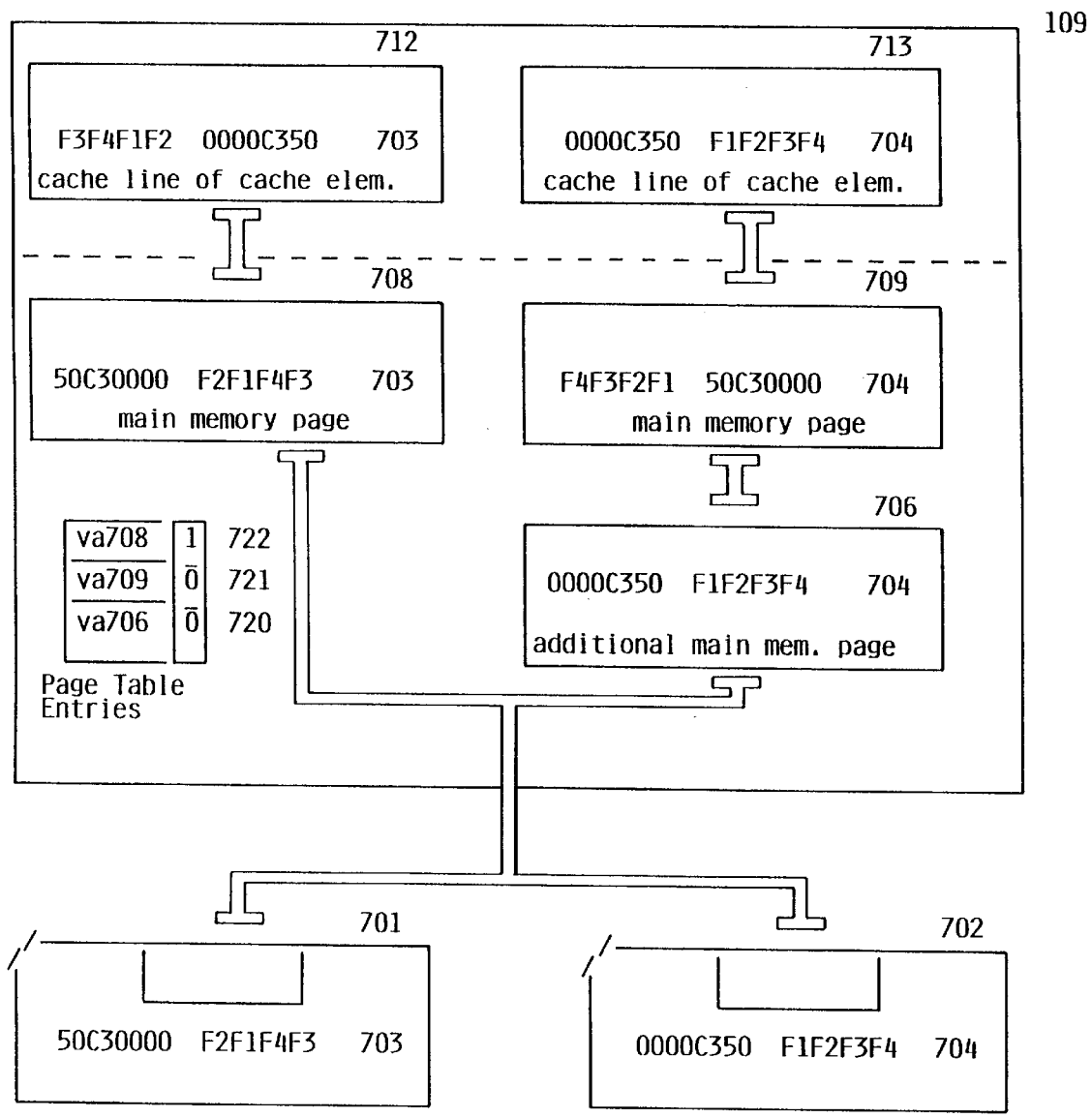

FIG. 7a is a logic flow diagram of how the mechanisms of the present invention carry out steps of this alternate embodiment. FIG. 7b is an example data flow diagram that shows example results of the steps taken by the mechanisms described in FIG. 7a.

Block 775 of FIG. 7a should be taken to represent the steps taken in blocks 650 through 675 of FIG. 6a. Since the steps taken are identical in this alternate embodiment, their details will not be reiterated here. As was discussed in the description of FIGS. 6a and 6b, the mechanisms of the preferred embodiment reflect little endian data before it is eventually copied from main memory 109 into cache memory 103, while big endian data is copied directly, byte for byte, from auxiliary storage into main memory 109 and from main memory 109 into cache memory 103. This design has the effect of making little endian tasks pay the reflection penalty on the data path between auxiliary storage and main memory, while not requiring the same from big endian tasks. For this reason, the I/O mechanisms of the preferred embodiment are considered "big endian biased." Through the use of additional functionality (i.e., reflection circuitry 121), the I/O mechanisms of this alternate embodiment allow a computer system to be adjusted such that its I/O mechanism can be set to be either "big endian biased" or "little endian biased." The I/O bias of computer system 100 is determined early in the boot process by operating system 165. If bias bit 156 of reflection circuitry 121 is set to logical 0, computer system 100 is set to be big endian biased and computer system 100 functions as has been described in FIGS. 6a and 6b and the accompanying text. If, instead, operating system 165 sets bias bit 156 to logical 1, computer system 100 operates with little endian biased I/O in accordance with the first alternate embodiment.

In block 782 of FIG. 7a, operating system 165 checks bias bit 156 to determine the I/O bias of computer system 100. If operating system 165 determines that computer system 100 is to operate as a big endian I/O biased computer system it proceed to block 685 of FIG. 6a [block 783 on FIG. 7a]. Since the steps taken are identical in this alternate embodiment, their details will not be reiterated here.

For the purposes of explaining this alternate embodiment, assume that operating system 165 determines that computer system 100 has been set to run as a little endian I/O biased computer system. Flow of control then moves to block 785, where operating system 165 determines whether the page involved is a big endian page or a little endian page. At this point, the mechanisms of this alternate embodiment perform different operations depending on the endian of the memory page in question. FIG. 7b shows an example of how big and little endian data is respectively loaded for big and little endian tasks. Consider first the example of a little endian task requesting little endian data 703. Little endian data 703 is shown to be stored in auxiliary storage as HEX 50C30000 F2F1F4F3. Since block 785 is answered negatively by checking page table entry 722, operating system 165 proceeds to block 780 where it causes little endian data 703 to be copied by DMA directly into memory page 708 of main memory 109. As has been explained, the execution of an RFI instruction [block 781] will cause the suspended task to resume execution in the task's endian. The task then reexecutes the instruction that originally caused the page fault, which will in turn ultimately causes cause data 703 in page 709 to be reflected into cache line 712 by reflection circuitry 121.

By contrast, consider now the example of big endian data 704. Big endian data is shown on FIG. 7b as HEX 000C350 F1F2F3F4. Big endian data 704 is the big endian form of little endian data 703 (i.e., each piece of data means the same thing, they are just stored differently). In this example, block 785 is answered affirmatively by checking page table entry 721. Therefore, operating system 165 proceeds to allocate additional memory page 706 [block 787]. Operating system 165 then causes big endian data 704 to be copied directly into additional memory page 706 [block 789]. Operating system 165 then invokes reflector 174 in block 791. Reflector 174 performs an in-place reflection of big endian data 704, per the PowerPC rules described in FIG. 3a and the accompanying text. Once big endian data 704 has been reflected, it is copied directly into main memory page 709 [block 797]. Again, an RFI instruction [block 782] will resume execution of the suspended task in the task's endian. The task then reexecutes the instruction that originally caused the page fault, which will in turn cause big endian data 704 in memory page 709 to be reflected into cache line 713 by reflection circuitry 121. This last reflection has the effect of reversing the previous reflection such that big endian data 704 appears in cache line 713 of cache memory 103 in the same form (i.e., the same as that in auxiliary storage), as is required by the PowerPC architecture. Similarly, the contents of cache line 712 are in reflected form relative to that of auxiliary storage, which is again the form required by the PowerPC architecture.

At this point, the data is available in cache memory 103 for access by the requesting task. Note, however, that the respective data appears in cache memory 103 in the appropriate format (i.e., reflected in case of little endian data and unreflected in the case of big endian data), regardless of whether the running task happened to be a big endian or little endian task.

Single Aliasing form of Shared Addressing

Figure 8A:
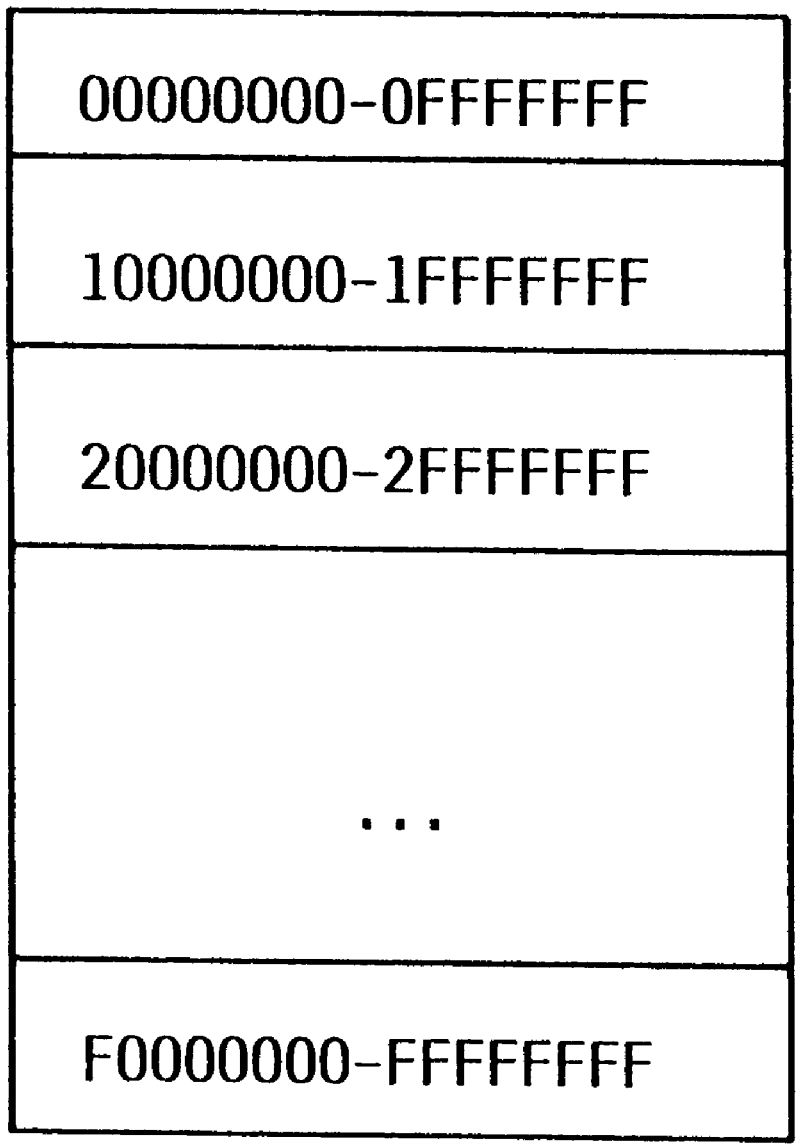
FIGS. 8a–8d are data diagrams to explain the single aliasing form of shared addressing used in the preferred and alternate embodiments.
Figure 8B:
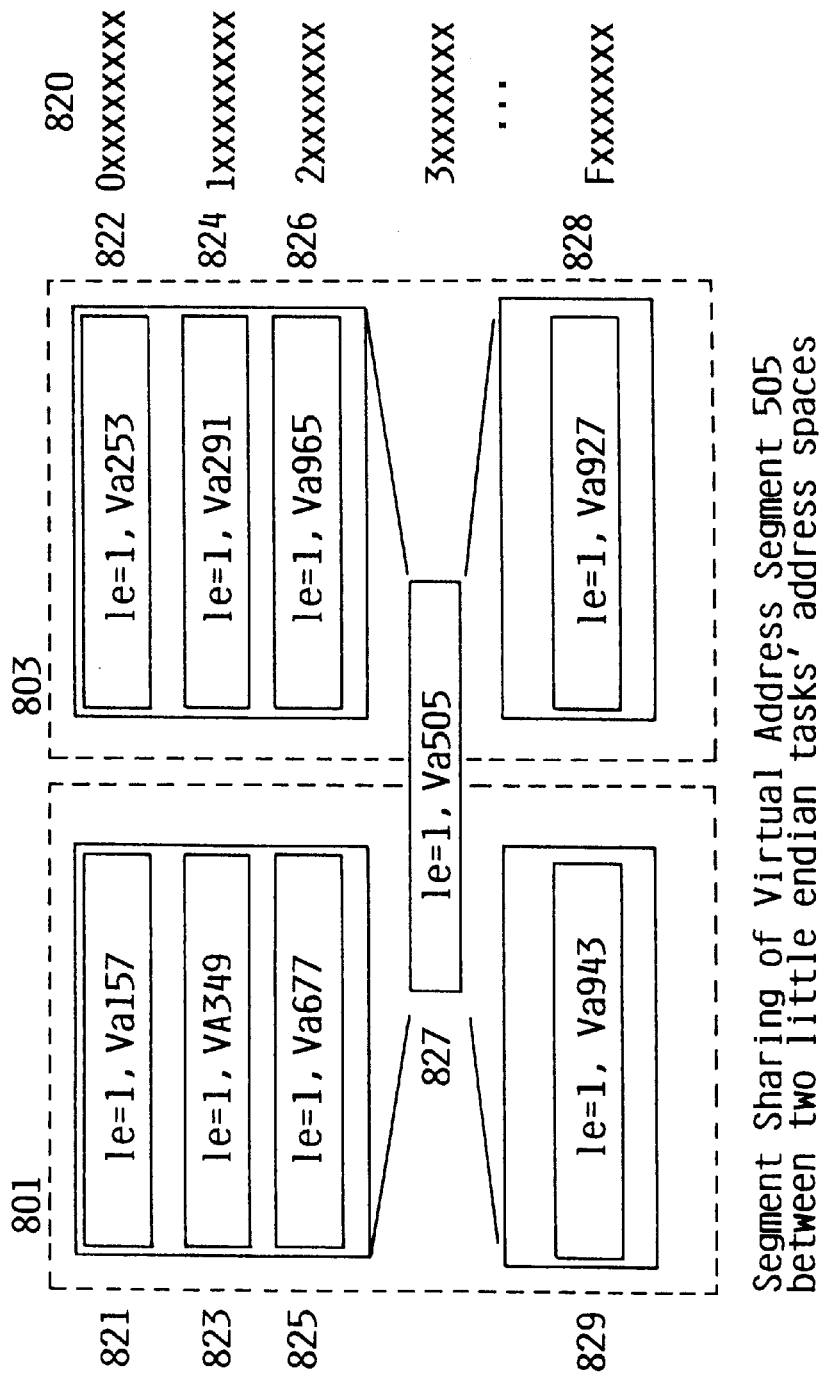

Both embodiments described up to now have not described the issue of data sharing explicitly. However, they implicitly presume the model of FIG. 8b. To begin with, at the simplest possible abstraction, each task in the system would have its own, separate address space (see FIG. 8a). That is to say, each task has its own, separate virtual address space, whose pages are entirely disjoint with every other task in the system. However, the simplistic scheme of FIG. 8a is really not practical for today's computer systems. To give but one reason, many if not most programs today are reentrant, which means that (if set up properly by the operating system), one copy of a given program can be used by an arbitrary number of tasks which execute the same program. The savings from this are so substantial that nearly all existing operating systems organize themselves to exploit reentrant capability. It is possible to share data as well.

Much more likely is the situation in FIG. 10b. Each task will have an address space which consists of the entire "virtual address" space defined by the machine architecture (2 to the 32nd bytes for a 601 PowerPC processor). Most of a task's code may still operate under the illusion that it has the entire address space to itself. However, some of the task's code is noticing and continuously managing the fact that some subsets of the storage are shared between tasks. There are many variations of this, but for the purposes of illustration, it is sufficient to describe a task's address space as consisting of up to sixteen virtual address segments. Thus, a given task can have an address space with up to 16 logically disjoint entities in it, some of which are unique to this task and some of which may be shared with all tasks in the system or with some cooperative subset of tasks.

In a Mixed Endian system of the present invention, the question arises as to what happens when a little endian task requires access to data in a big endian virtual address segment.

Through a process called mapping, a given virtual address segment is associated with a given segment in the address space of the requesting task which has discovered the existence of some segment and is permitted to address it. Once the mapping is performed, the segment is part of the address space of the task and can be accessed through the usual address translation mechanisms and thus have ordinary data references performed.

If the operating system restricts things such that a given virtual address segment is always referenced by tasks operating in the same endian, then the model in 8b is entirely sufficient for any discussion of data sharing between tasks, the data is always correctly reflected (or not) and operations proceed normally. In the example show, two little endian address spaces share little endian virtual address segments (e.g. 827) or have segments dedicated to their own processing (e.g. 821 or 822). The only data sharing occurs between tasks of the same endian. It is enough to note that in the operating system need merely associate an endian bit in the segment's control structures for each segment. This is easily done; when a segment is created, it is enough to note the LE value in the MSR of the task which created it. In this environment, there is a very limited mixed endian environment such that tasks can be dispatched in either endian, but cannot directly share data across endians (that is, across address spaces of unlike endian). The page table bits can be duly recorded from their associated segment bit in the page tables, but this is largely to assist the I/O processing in order to ensure that the low level I/O code is able to decide whether to reflect the data or not on I/O DMA operations.

Note also that software using these comparatively simple mechanisms of 8b can also support the circumstances of FIG. 8a.

Note also that in this alternate form, the only change necessary in FIG. 6a is to fetch the page table entry LE bit 177 from the segment's LE bit instead of the address space. Since the pages virtual address 176 implicitly contains the segment address, this is trivial to do.

Figure 8C:
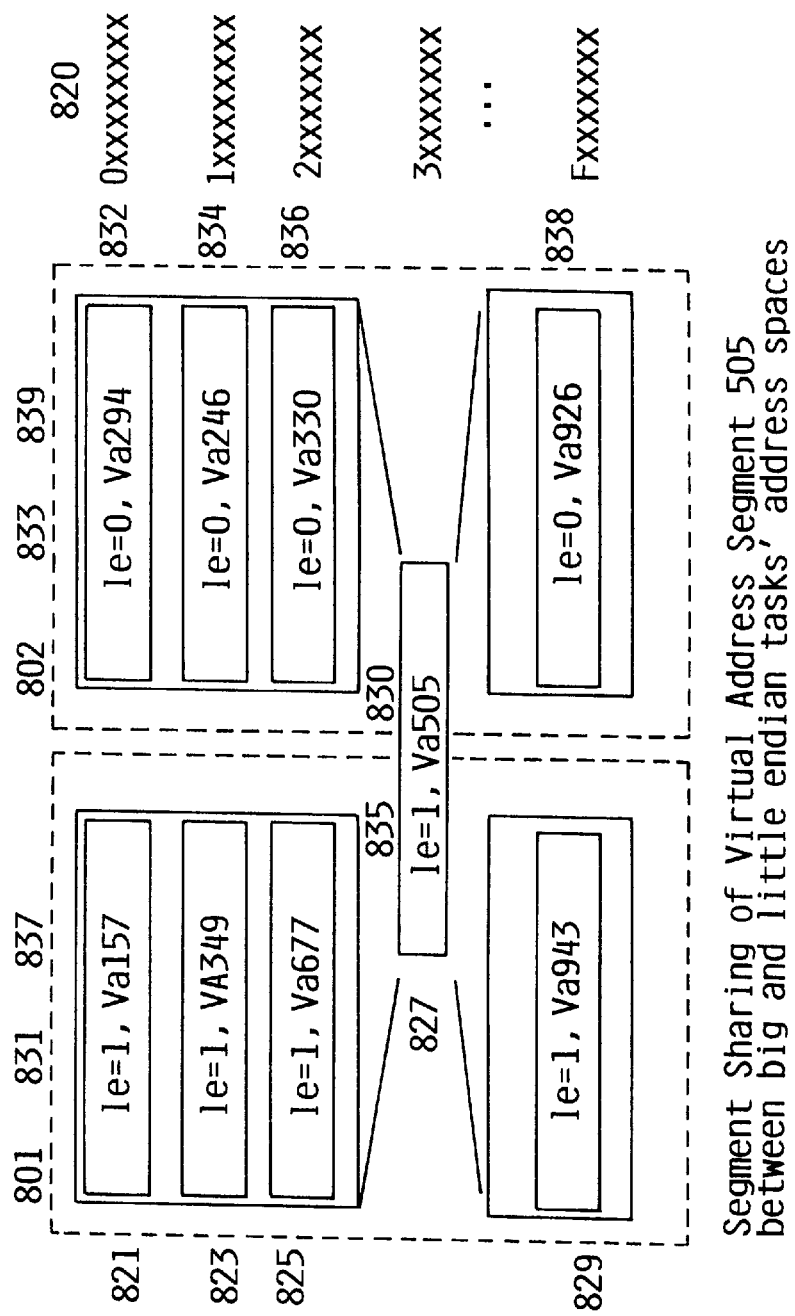

Now, suppose, as in this invention, there is a desire to go further. Suppose instead there is a desire for a segment to be shared between a big and little endian task. In that case, the "single aliased" model is used. In this model, the environment of FIG. 8c is used. A given segment is created according to the LE value of the creating task (unless a special interface permits the endian bit to be directly specified; a typical interface, ported over from monoendian environments, would not need to do so). As in 8b, the endian bit associated with that segment is remembered. However, unlike the environment in 8b, it is permitted to map the segment into address spaces representing tasks in the other endian. Since the "virtual address" of the segment is a standard PowerPC virtual address, it is linked into the addressability in the usual way the architecture requires. Both the big endian and little endian tasks may now address any location in the segment and will access the data in the shared segment. Exactly how that happens needs explanation, however.

In PowerPC architecture, as recited in Appendix D, there are clear consequences. The architecture describes a format called "PowerPC endian", which is its way of describing that if data created under little endian rules (LE 129 is a one) is accessed by merely turning off the LE bit to zero, the result merely turns off address modification. Accordingly, the big endian task accessing data created in little endian mode under these addressing rules will not see little endian data; it will see the data in its double word reflected format; in effect, big endian data at the wrong offsets. To make a cross endian access under these rules, the programmer's big endian code accessing little endian data must manually perform the address modification (that is, perform the operations of FIG. 3b on aligned data and other, similar known operations (not described) on unaligned data. In effect, the programmer must "manually" account for the fact that the data is in double word reflected format.

Consider a big endian program performing under a task associated with address space 802 and wishing to access shared segment Va505 (827). The virtual address segment Va505(827) is a little endian segment (le=1 in 835) and its pages are managed as previously described for little endian data pages. It is thus seen in double word reflected format when referenced by a big endian program executing references to any offset in address space 802's mapping of Va505 (accessed, as in 801, via mapping it into virtual address range 30000000 through 3FFFFFFF hexadecimal addresses, as implied by the address map list 820).

By contrast, little endian programs executing under the circumstances of FIG. 8c under tasks associated with address space 801 will see normal little endian data and may accordingly make conventional references. This is because, as before, all pages associated with virtual address segment 827 have their le bit equal to 1 (see 835) and are in the expected double word reflected format for little endian pages as required by PowerPC architecture. This is due to the propagation of the le bit value of 1 at 835 into every page table entry as each page is being created (whether originally at the behest of a little endian program executing under a task associated with address space 801 or a big endian program executing under a task associated with address space 802).

Figure 8D:
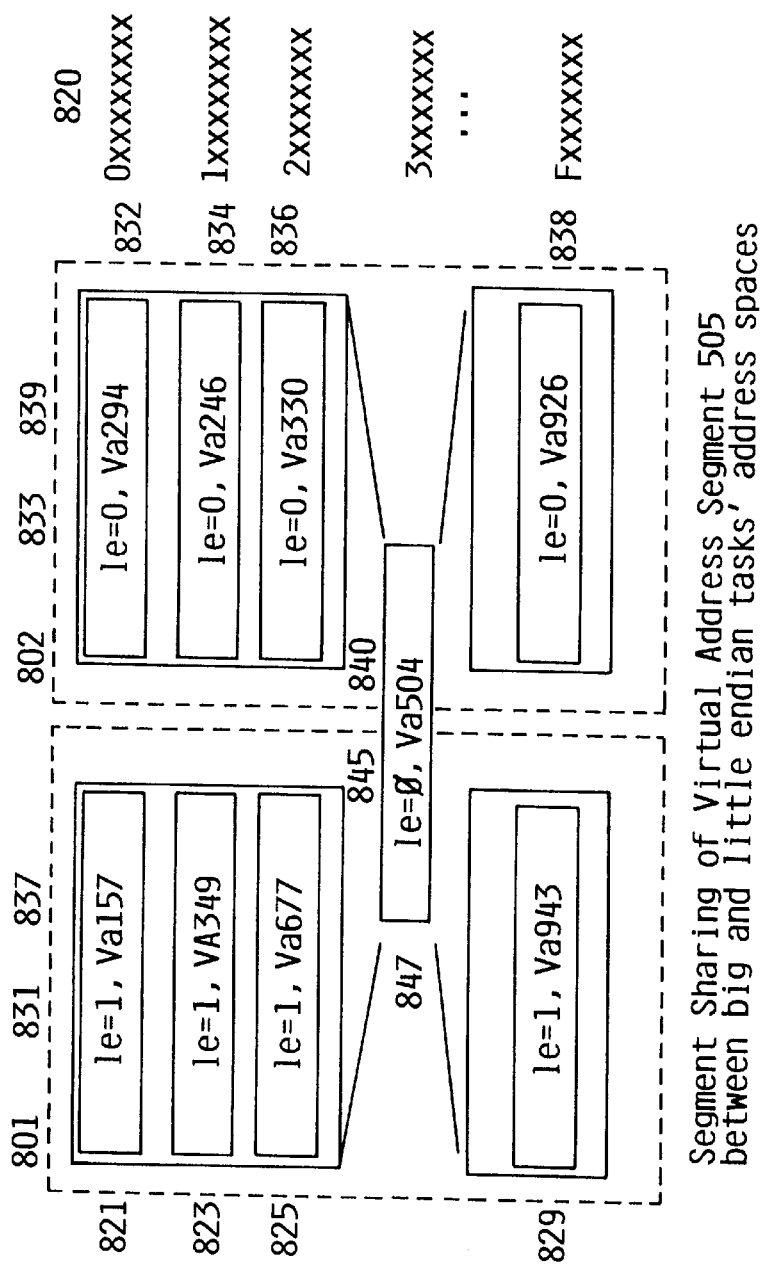

Now consider FIG. 8d, which has the same address spaces 801 and 802, except they have unmapped Va505 and have instead mapped big endian segment Va504 (847) with le=0 (845).

This will reverse the "endian" situation. The changed value of le=0 at 845 would cause the operating system to now ensure that all pages in the range 30000000 through 3FFFFFFF hexadecimal address for both 801 and 802's pages to be paged in under big endian rules. Thus, tasks executing big endian programs under address space 802 see ordinary big endian data and make conventional references. But, what of little endian?

By symmetry, the little endian programmer must manually "undo" the address modification by manually performing it since the hardware will still perform it. Since the modification is the symmetric exclusive OR function, the result is no net modification. So, both programs make the same modifications and access the correct data at different offsets when accessing data whose le value is different from the value in their MSR LE bit (129).

This is perhaps most clearly seen if one considers a big endian program accessing little endian data from cache line 612 of FIG. 6b, which is another way of viewing the situation in FIG. 8c in a particular cache line of virtual address segment Va505 (827). By XORing a 4, the hexadecimal quantity 0000C350 is correctly accessed. By XORing a 6, the hexadecimal quantity F1F2 is correctly accessed (compare 603 in 612 with 603 in 606 of FIG. 6b). Note that since the endian bits in the segment and the page table are correctly tracked, even when referenced by a big endian task, the processing of FIG. 6 produces the same result and so the data is "seen" the same, except for this cross-endian reference, there is no address modification. Likewise, the little endian task desiring to read big endian data (as just described for 8d) XORs a 4 with its expected address (offset 0), which the hardware again XORs with a 4 to access 0000C350 from 604 in cache line 613 and the program XORs a 6 to access F1F2 from 603 in 612, while the hardware re-performs the XOR of 6 on the presented address (compare 604 in 609 to 604 in 613, and remember to account for the fact that the hardware also XORs the programmer's presented address with 4 or 6, respectively—see FIG. 6*b*).

Operating System

The operating system (which, as a practical matter will be in a fixed endian) must also manage references to data coming in from tasks in the endian opposite to it.

The situation in FIG. 8*c* or 8*d* is sufficient to describe this relationship since we can assume (thanks to the discussions of 8*c* and 8*d*) that the operating system is in either endian. Thus, whenever the application program desires to enter the supervisor (due to an error or due to some supervisor call meant to access operating system services), the operating system will, one way or another, map the segment which has the details of the request (or, the failing instruction in case of error) into its own address space. It may therefore take on the role of the "disfavored" endian (e.g. the role of tasks assigned to address space 802 in the above discussion for a big endian operating system operating on the application's little endian data in FIG. 8*c* or for tasks assigned to address space 801 operating on big endian data in FIG. 8*d*).

Note that this same rule will apply in ways which should be obvious to those skilled in the art even if the operating system is operating in "real" mode with virtual addressing disabled, because it will have to still behave in the manner described for the disfavored endian above.

Those skilled in the art will appreciate that operating systems may have a great variety of internal relationships, possibly including, in very complex cases, portions of the operating system being in a different endian. Yet, those skilled in the art will nonetheless understand how to extend the above mechanisms meet such situations.

Server Operation

Conventional servers (e.g. one or more of servers 190) can still be written in these environments to operate under a single endian. That is to say, they may receive requests, over any suitable means, such as a pseudo-I/O operation, from an arbitrary number of client requesters. Conventional servers would merely require that all such requests come from tasks sharing the same endian of the server.

However, an advanced server may wish to exploit the rules of FIG. 8*c* or 8*d* and so serve clients of the opposite endian. To do so, the client would also use the self-same invocation of the operating system just described; the operating system would look at the endian of the client and server and double word reflect (or not) a copy of the incoming client message into the server's address space based on whether or not the two were of the same endian (simple byte by byte copy) or of different endian (double word reflection of the operands from client storage to server).

Once the server has the request, it would form the answer in its own storage as per normal operation. When it comes time to deliver the data, using the operating system to move data between address spaces as is conventionally required, a check needs to be made. If the data is to be sent to the "other" endian, a double word reflection will be done between server and client into the memory page reserved for the client's result.

In this simplified server flow, the data as seen by the server and by the client will be in "reversed" form; that is, the individual integers in the message will be reversed (that is, in the opposite endian). Accordingly, a mixed endian server will have to be "endian aware" and inquire of the operating system which kind of client sent the data before operating on it. In this variant, too, the client would have to know the server's endian.

However, if the server were really advanced, and the interfaces of the proper form, an additional advance is possible. The server would be able, in many cases, to reverse the individual fields of the response (since it would have the required knowledge of the data structure). In this case, only the server would have to enquire of the client's endian and the client could transparently access the server of a different endian.

Note that "client" and "server" here have industry standard meanings, but those skilled in the art will readily appreciate that the mechanisms disclosed above would apply to many other relationships between tasks of different endian.

Interrupt Processing

As noted, the LE bit is always set if the endian of the current software task is little endian, and is always cleared if the current software endian is big endian.

Upon initialization, computer system 100 begins in a known endian. During initialization, the operating system typically sets ILE bit 127 to indicate the endian required by interrupt handler 171 (i.e., whether interrupt handler 171 is a big endian task or a little endian task). ILE bit 127 is required for interrupt handling because processor 101 may be required to handle an interrupt at any time. During a context switch from a current software task to interrupt handler 171, a problem arises if the current software task is running in an endian which is different from that of interrupt handler 171. During the context switch, control is atomically passed from the current software task to interrupt handler 171, and processor 101 must therefore also atomically change whether or not data endian conversion is to be performed. ILE bit 127 of the present invention allows the processor to correctly interpret data in main memory during a context switch while interrupt handler 171 has control of processor 101.

Figure 9:
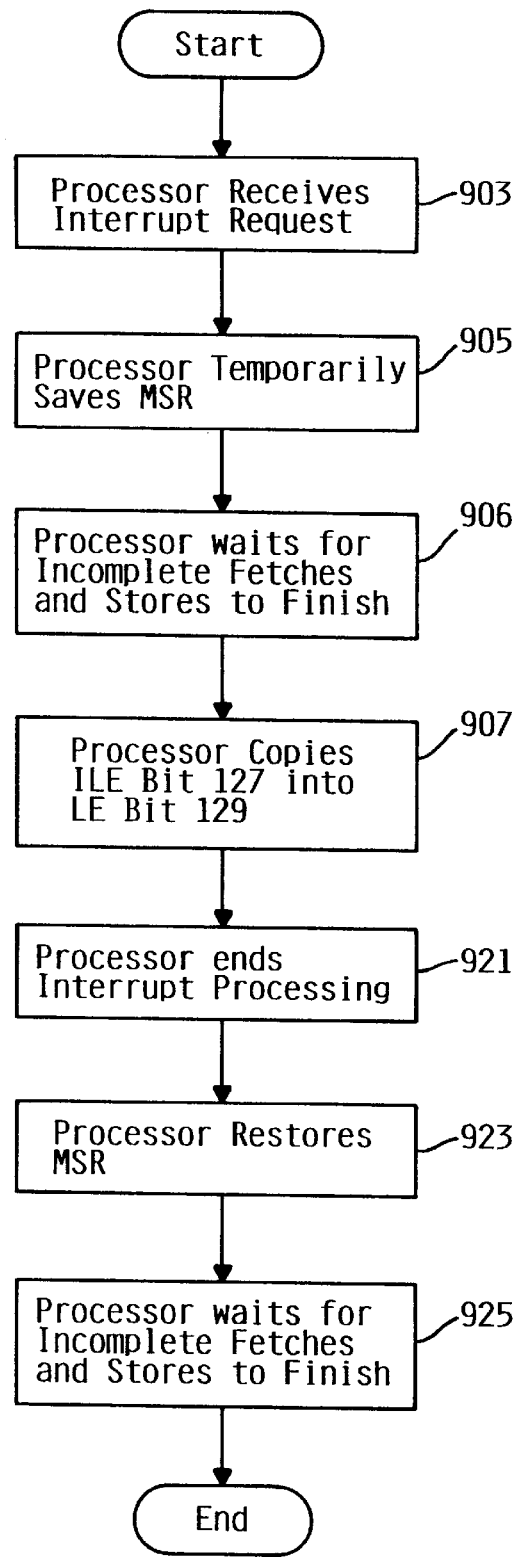
FIG. 9 is high level logic diagram that describes how the mixed endian circuitry of the preferred embodiment interacts with the interrupt handler of the preferred embodiment.

A preferred interrupt processing method for the mixed-endian computer system of the present invention is shown in FIG. 9. Processor 101 receives an interrupt request at 903. As part of the context switch, MSR 105 is saved in a temporary location [block 905]. In highly pipelined machines, data fetches and stores may have been successfully translated, but actual processing (e.g., see 693 of FIG. 6*a*) may still be pending for one or more operations. If so, processor 101 waits for such operations to finish [block 706]. ILE bit 127 is copied to the LE bit 129 [block 907]. Note again that any prior memory operations must have completed before ILE bit 127 is then copied to LE bit 129, and then the new value of LE bit 129 must control subsequent memory fetches. In other words, the value change of LE bit 129 is atomic. This is similar to interrupt handling for other typical interrupts commonly processed by current processors, except for the critical observation that designers designing to bi-endian and not mixed endian rules may deliberately or accidentally design the processor in such a way as to fail to meet these mixed-endian requirements on some pathways. A reliable mixed-endian computer system must ensure that all pathways and cache optimizations meet the aforementioned atomicity requirements; a bi-endian need only meet these requirements for a single, well-defined interrupt. Once the interrupt routine is running, fetches and stores occur as described above using the new value of LE bit 129 (i.e., as described in FIGS. 6*a* and 6*b*).

Upon completion of interrupt processing [block 921], MSR 105 is restored [block 923], processor 101 waits for incomplete fetches and stores to complete [block 925], and execution of the current software task continues at the point before the context switch. As described above, any change of LE from its old value to its new value must be atomic. It is assumed that there is a return from interrupt instruction which restores the saved MSR, and atomically resumes from the interrupt processing of the interrupted instruction.

General Applicability

It is important to note here that while the examples set forth above involved the use of data stored on auxiliary storage devices (e.g., rotating disks), the present invention is not limited in applicability to this type of storage device. Indeed, those skilled in the art will appreciate and understand that the present invention applies equally to any means of storing or communicating both big and little endian data on/to a single computer system.

For example, the embodiments of the mixed endian computer system disclosed herein would perform equally as well in an environment where data was passed between bus connected computer systems or processors because in the end the passed data would still be loaded into cache memory 103 and main memory 109 by big endian programs 155 and/or little endian programs 160. Similarly, data that was received from an external computer network via communications interface 147 would similarly need to be loaded into cache memory 103 and main memory 109 by big endian programs 155 and/or little endian programs 160.

In addition, the examples of integer data set forth in this specification utilize only aligned data for the purposes of straightforward illustration. However, those skilled in the art will appreciate that the concepts and techniques that are described herein are readily extendable to unaligned data (e.g., a 16 bit integer beginning on an odd address boundary) and that unaligned data cases are well within the spirit and scope of the present invention.

Big and Little Endian Instructions

While it has been implied throughout this specification, it should be explicitly noted here that the mechanisms of the present invention are also used to allow tasks of different endian to both execute on computer system 100. Since in PowerPC and other like computer system the instructions of big endian programs are in big endian format and the instructions of little endian programs are in little endian format, the above-described reflection and address modification is necessary to allow little endian tasks to execute on the enhanced PowerPC processor of the present invention.

Given that instructions are really data from the perspective of memory, those skilled in the art will understand that the way in which big and little endian instructions are handled by the mechanisms of the present invention is logically identical to the way in which big and little endian data is handled by the mechanisms of the present invention. Accordingly, general details of big and little endian instruction handling is not reiterated here. However, it is worthwhile to point out that the instruction cache of computer system 100, which while not shown on FIG. 1 is known to be included in PowerPC computer systems, would be used instead of cache memory 103 for handling instructions. It is also worthwhile to point out that since instructions are always the size of a single word, the XOR 4 address modification shown in FIG. 3*b* would be the only address modification used. Of course, this latter address modification statement is one of practical use, not one of applicability of the present invention. Those skilled in the art will appreciate that the present invention applies equally to instructions of different sizes, even if the instructions are smaller or larger in size than that denoted in FIG. 3*b* and even if the instructions were designed to be in a fixed endian, big or little, but accessing data in the endian implied by the LE bit equivalent.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer-implemented method, said method comprising the steps of:

initiating a first request for data, said request being initiated by a first program of a particular endian type, said first program executing as a task on a processor;

copying said data from secondary storage into main memory;

reflecting said data;

presenting said data to said first program;

storing said data back into said main memory;

storing an indication that said data was reflected in said reflecting step;

initiating a second request for said data, said request being initiated by a second program of said particular endian type, said first program executing as a task on a processor;

recognizing that said second program and said first program are of said particular endian type; and presenting said data to said second program.

2. The computer-implemented method of claim 1 further comprising the steps of:

initiating a second request for said data, said request being initiated by a second program of a different endian type, said first program executing as a task on a processor;

recognizing that said second program and said first program are of different endian type;

reflecting said data;

storing said data into said secondary storage;

copying said data from said secondary storage into said main memory; and presenting said data to said second program.

3. A computer system, said computer system comprising the steps of:

means for initiating a first request for data, said request being initiated by a first program of a particular endian type, said first program executing as a task on a processor;

means for copying said data from secondary storage into main memory;

means for reflecting said data;

means for presenting said data to said first program;

means for storing said data back into said main memory;

means for storing an indication that said data was reflected in said reflecting step;

means for initiating a second request for said data, said request being initiated by a second program of said particular endian type, said first program executing as a task on a processor;

means for recognizing that said second program and said first program are of said particular endian type; and means for presenting said data to said second program.

4. The computer system method of claim 3 further comprising the steps of:

means for initiating a second request for said data, said request being initiated by a second program of a different endian type, said first program executing as a task on a processor;

means for recognizing that said second program and said first program are of different endian type;

means for reflecting said data;

means for storing said data into said secondary storage;

means for copying said data from said secondary storage into said main memory; and means for presenting said data to said second program.

* * * * *